(12) United States Patent
Ueda et al.

(10) Patent No.: US 8,197,931 B2
(45) Date of Patent: *Jun. 12, 2012

(54) WHITE POLYESTER FILM AND REFLECTION SHEET

(75) Inventors: Takashi Ueda, Mishima (JP); Hideki Fujii, Otsu (JP); Tatsuo Yoshida, Anpachi (JP); Kozo Takahashi, Otsu (JP); Masahiro Okuda, Otsu (JP); Kazunori Tanaka, Otsu (JP); Toshihiko Hiraoka, Otsu (JP)

(73) Assignee: Toray Industries, Inc. (JP)

( * ) Notice: Subject to any disclaimer, the term of this patent is extended or adjusted under 35 U.S.C. 154(b) by 196 days.

This patent is subject to a terminal disclaimer.

(21) Appl. No.: 12/525,356

(22) PCT Filed: Jan. 28, 2008

(86) PCT No.: PCT/JP2008/051152
§ 371 (c)(1),
(2), (4) Date: Nov. 3, 2009

(87) PCT Pub. No.: WO2008/093623
PCT Pub. Date: Aug. 7, 2008

(65) Prior Publication Data
US 2010/0086736 A1    Apr. 8, 2010

(30) Foreign Application Priority Data

Jan. 31, 2007  (JP) ................................. 2007-020578
Feb. 21, 2007  (JP) ................................. 2007-040487

(51) Int. Cl.
*B32B 5/22*   (2006.01)
*B29C 49/08*  (2006.01)

(52) U.S. Cl. ............... 428/317.9; 428/319.3; 428/319.7; 525/165; 525/444; 524/601; 264/288.4; 264/290.2

(58) Field of Classification Search ............... 428/319.3, 428/319.7, 317.9; 525/165, 444; 524/601; 264/288.4, 290.2
See application file for complete search history.

(56) References Cited

U.S. PATENT DOCUMENTS

| | | | |
|---|---|---|---|
| 5,844,731 A | | 12/1998 | Kabumoto et al. |
| 5,912,060 A | * | 6/1999 | Kishida et al. ............... 428/35.2 |
| 6,090,898 A | * | 7/2000 | Tsunekawa et al. .......... 525/444 |
| 6,916,548 B2 | * | 7/2005 | Murschall et al. ............ 428/480 |
| 2003/0068466 A1 | | 4/2003 | Mimura et al. |
| 2003/0157352 A1 | * | 8/2003 | Murschall et al. ............ 428/483 |
| 2007/0014982 A1 | | 1/2007 | Mimura et al. |
| 2009/0042016 A1 | * | 2/2009 | Yoshida et al. ............ 428/317.9 |

FOREIGN PATENT DOCUMENTS

| | | |
|---|---|---|
| JP | 61-271308 | 12/1986 |
| JP | 4-239540 A | 8/1992 |
| JP | 5-9319 A | 1/1993 |
| JP | 5-140349 | 6/1993 |

(Continued)

*Primary Examiner* — Hai Vo
(74) *Attorney, Agent, or Firm* — DLA Piper LLP (US)

(57) ABSTRACT

A white polyester film containing voids, wherein a resin constituting the film has a layer (layer A) formed by using a polyester resin and a cyclic olefin copolymerized resin, and wherein a void ratio taken in a cross-section of the layer is more than 25% and 75% or less and the average particle size of the cyclic olefin copolymerized resin in the film is 0.1 μm or more and 3 μm or less.

15 Claims, 4 Drawing Sheets

FOREIGN PATENT DOCUMENTS

| | | |
|---|---|---|
| JP | 8-302048 | 11/1996 |
| JP | 10-278204 A | 10/1998 |
| JP | 2001-288284 A | 10/2001 |
| JP | 2001-526982 A | 12/2001 |
| JP | 2002-90515 | 3/2002 |
| JP | 2002-098808 A | 4/2002 |
| JP | 2004-70117 A | 3/2004 |
| JP | 2004-126345 A | 4/2004 |
| JP | 2004-330727 A | 11/2004 |
| WO | 97/01117 | 1/1997 |
| WO | 99/33647 | 7/1999 |

* cited by examiner

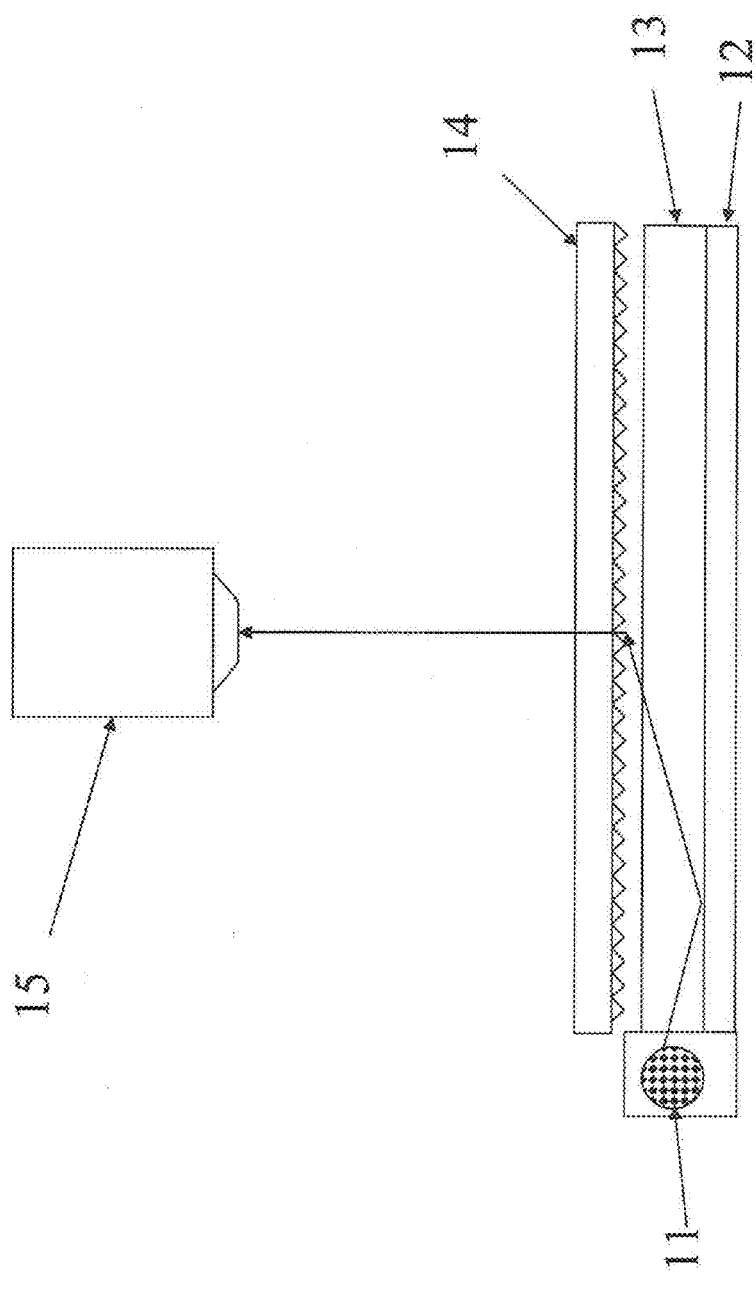

WHITE POLYESTER FILM AND REFLECTION SHEET

RELATED APPLICATIONS

This is a §371 of International Application No. PCT/JP2008/051152, with an international filing date of Jan. 28, 2008 (WO 2008/093623 A1, published Aug. 7, 2008), which is based on Japanese Patent Application Nos. 2007-020578, filed Jan. 31, 2007, and 2007-040487, filed Feb. 21, 2007.

TECHNICAL FIELD

This disclosure relates to a white polyester film. More particularly, this disclosure relates to a white polyester film which contains voids therein, has an excellent reflection property and an excellent hiding property, and has high productivity, and which can be suitably used for a backlight system for image display, a reflection sheet of a lamp reflector, a reflection sheet of lighting equipment, a reflection sheet for an illuminated signboard, a back-reflection sheet for a solar cell, and the like.

BACKGROUND

White polyester films are widely used for applications such as a reflector and a reflection sheet of a surface illuminant apparatus in a flat-panel image display system used for liquid crystal display or the like, a rear-reflection sheet for an illuminated signboard and a back-reflection sheet for a solar cell because of characteristics that these film have uniform and high brightness and dimensional stability, and are low priced. As a method of exhibiting high brightness, there are widely employed methods of utilizing a difference in refractive indexes between inorganic particles contained in a polyester film and a polyester resin, or a difference in refractive indexes between minute voids and a polyester resin, such as a method in which a polyester film contains a great number of inorganic particles such as barium sulfate and light reflection at an interfacial surface between a polyester resin and a particle and a void's interfacial surface of the minute void produced with a core of particles is utilized (Japanese Unexamined Patent Publication No. 2004-330727), a method in which light reflection at a void's interfacial surface of the minute void produced with a core of a resin which is not soluble in polyester by fixing the resin which is, not soluble in polyester is utilized (Japanese Unexamined Patent Publication No. 4-239540), and a method in which light reflection at an interfacial surface of the void internally produced by including inert gas in a polyester film in a pressure vessel is utilized (International Publication WO 97/01117 pamphlet).

In recent years, particularly, applications in which liquid crystal display is used are remarkably expanded and the liquid crystal display is widely adopted for LCD televisions in addition to conventional laptop computers, monitors, and mobile devices, and in accordance with this, higher brightness and higher definition of a screen are required. There are requirements for high brightness and a high hiding property in reflecting sheets in response to the higher brightness of the screen. In accordance with these requirements, actions of increasing number of interfacial surfaces to reflect light in the polyester film, such as increasing an amount of inorganic particles in the polyester film and increasing an amount of a resin which is not soluble in polyester, are required, however there arises a problem that by increasing the amounts of inorganic particles and a resin which is not soluble in polyester, a film break often occurs during biaxial stretching and productivity is deteriorated, and it was difficult to achieve high brightness/high hiding property and the productivity of a film simultaneously. Further, the reflection sheet requires that its deterioration is suppressed and it can be used stably even if it is used for a long time. Hence, for example, in Japanese Unexamined Patent Publication No. 2002-098808, a void-containing polyester film containing a light stabilizer to secure the stability is disclosed.

Further, generally, a biaxially stretched polyester film easily produces static electricity and has a problem that dust adheres to the film during film forming and processing steps and when used. In recent years, since the above-mentioned dust has a large effect on production loss as a result of upsizing of a screen, a request for protecting each member from fouling during a production step of a liquid crystal monitor for which the polyester film is used be is increasing. For this request, an effect of preventing the fouling is achieved by providing an antistatic property for the film in Japanese Unexamined Patent Publication No. 10-278204. However, the film presented in Japanese Unexamined Patent Publication No. 10-278204 cannot be applied to a liquid crystal display device requiring light stability, and therefore an optical film which achieves light stability and an antifouling property simultaneously is required.

Further, on the other hand, species of resin which is not soluble in polyester are also studied (Japanese Unexamined Patent Publication Nos. 5-9319, 8-302048 and 2001-288284). However, it becomes difficult to respond to the high brightness and the high hiding property in recent years by technologies described in these Patent Documents, and further in Japanese Unexamined Patent Publication No. 2001-288284, the film is aimed to achieve cost and performance simultaneously by use of a cycloolefin copolymer and an ultraviolet stabilizer, but this film does not adequately achieve the suppression of the deterioration of reflectivity due to ultraviolet ray and screen brightness simultaneously.

It could therefore be helpful to provide a white polyester film achieving productivity and performance simultaneously, which achieves high brightness and a high hiding property simultaneously and hardly causes a film break and uneven luminance in a width direction, as well as achieving light stability and an antifouling property simultaneously.

SUMMARY

We thus provide a white polyester film containing voids therein, wherein a resin constituting the film has a layer formed by using a polyester resin and a cyclic olefin copolymerized resin, and wherein a void ratio in the layer is more than 25% and 75% or less and the average particle size on number of the cyclic olefin copolymerized resin in the film is 0.1 μm or more and 3 μm or less.

Further, the white polyester film has preferable aspects in the following paragraphs (a) to (r):

(a) A variation coefficient of Particle Size of the cyclic olefin copolymerized resin in the layer formed by using a polyester resin and a cyclic olefin copolymerized resin is 1 or less.

(b) In the layer formed by using a polyester resin and a cyclic olefin copolymerized resin, the content of the polyester resin is 60% by weight or more and less than 90% by weight and the content of the cyclic olefin copolymerized resin is more than 10% by weight and 40% by weight or less.

(c) An apparent density is 0.5 g/cm$^3$ or more and 1.0 g/cm$^3$ or less.

(d) A parallel light transmittance is less than 0.8%.

(e) A light reflectivity is 100% or more.

(f) A glass transition temperature of the cyclic olefin copolymerized resin is 120° C. or higher and 230° C. or lower.

(g) A MVR of the cyclic olefin copolymerized resin at 260° C. is 1 to 50 ml/10 min.

(h) A resin constituting the layer, formed by using a polyester resin and a cyclic olefin copolymerized resin, contains a block copolymerized resin of polyalkylene glycol and polyester comprising an aliphatic diol component having 2 to 6 carbon atoms and phthalic acid in an amount of 0.05% by weight or more and 15% by weight or less.

(i) A resin constituting the layer, formed by using a polyester resin and a cyclic olefin copolymerized resin, contains a copolyester resin, in which a diol component includes alicyclic glycol, in an amount of 0.1 to 25% by weight.

(j) A polyester resin layer not substantially containing a cyclic olefin copolymerized resin is layered on at least one side of the layer formed by using a polyester resin and a cyclic olefin copolymerized resin.

(k) A light stabilizer is contained in the polyester resin layer in an amount of 0.05 to 10% by weight relative to the polyester resin layer.

(l) The light stabilizer is a triazine derivative.

(m) The polyester resin layer contains titanium dioxide particles.

(n) An applied layer layered on the outermost surface of at least one side of the layer formed by using a polyester resin and a cyclic olefin copolymerized resin or the aforementioned polyester resin layer contains an antistatic agent and a surface resistivity of the applied layer is $1 \times 10^{13}$ ohms/square or less.

(o) The surface of either one side of the white polyester film has mean roughness (SRa) of 100 nm or more and 450 nm or less and ten-point mean roughness (SRz) of 1 μm or more and 4 μm or less.

(p) The polyester resin is polyester produced by using a titanium compound as a polymerization catalyst.

(q) A reflection sheet formed by using the white polyester film as a reflecting material.

(r) A white polyester film for a reflector of liquid crystal display, wherein a polyester layer (B) containing a light stabilizer is layered on at least one side of a polyester layer (A) having minute air bubbles, the polyester layer (A) contains a cycloolefin copolymerized resin in an amount of 5 to 40% by weight relative to the total weight of the polyester layer (A) and polyalkylene glycol copolyester and an average reflectivity of the surface of at least one side of the film is 97% or more.

We thus obtain a white polyester film achieving productivity and performance simultaneously, which achieves high brightness and a high hiding property simultaneously and hardly causes a film break and uneven luminance in a width direction during production at low costs. Further, we achieve light stability and an antifouling property simultaneously.

BRIEF DESCRIPTION OF THE DRAWINGS

FIG. 6 is a conceptual diagram of a brightness measuring system (b measuring method).

DESCRIPTION OF THE REFERENCE NUMERALS AND SYMBOLS

Figure 2:
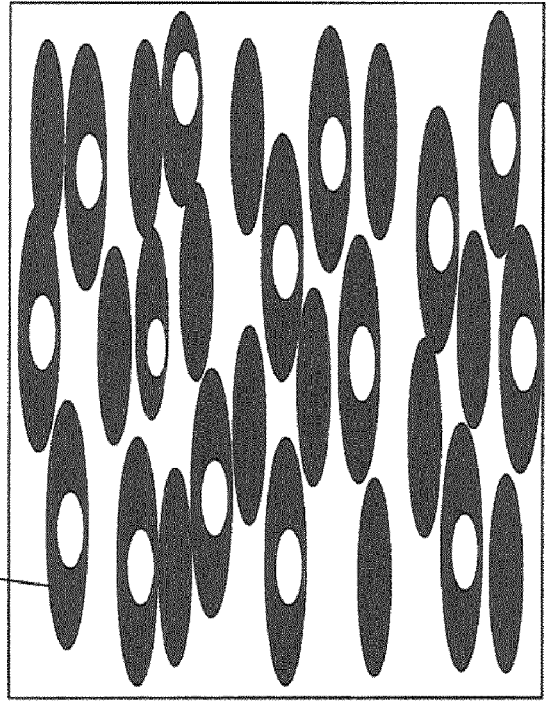
FIG. 2 is a schematic view of a cross-section of a polyester film containing voids in which void portions are blacked out.

| 1 | polyester resin |
| --- | --- |
| 2 | void |
| 3 | cyclic olefin copolymerized resin |
| 4 | portion blacked out with a permanent marker |
| 5 | polyester resin |
| 6 | void |
| 7 | cyclic olefin copolymerized resin |
| 8 | portion blacked out with a permanent marker |
| 9 | sample at a central position in a width direction in forming a film |
| 10 | sample at an end position in a width direction in forming a film |
| 11 | fluorescent tube |
| 12 | reflection film |
| 13 | light guide plate |
| 14 | diffusing film |
| 15 | brightness meter |

DETAILED DESCRIPTION

We provide a highly productive white polyester film which has high brightness and a high hiding property simultaneously and further light stability and an antifouling property simultaneously, and which can attain high productivity that a film break hardly occurs during production, and consequently they found that a polyester film having a specific constitution can solve such problems in one swoop.

The white polyester film needs to be a white polyester film containing voids therein, wherein a resin constituting the film has a layer formed by using a polyester resin and a cyclic olefin copolymerized resin, and wherein a void ratio taken in a cross-section of the layer is more than 25% and 75% or less and the average particle size on number of the cyclic olefin copolymerized resin in the film is 0.1 μm or more and 3 μm or less, and by employing such a constitution, it becomes possible to improve the brightness and the hiding property of a film outstandingly.

We found that a reflection property should not be simply specified by a void volume or an additive amount of an immiscible component previously considered and the reflection property is mainly governed by number of interfacial surfaces produced by voids existing within the film.

The reason why merely an increase in amounts of immiscible components did not contribute to an improvement in brightness in conventional white polyester films is probably that the number of interfacial surfaces was not increased effectively because of the joining together of air bubbles or the joining together of immiscible components which become a nucleus of void formation.

A component in the void (hereinafter, sometimes referred to as a "vapor phase") is generally air, the void may be under vacuum or may be filled with other gas components, and examples of other gas components include oxygen, nitrogen, hydrogen, chlorine, carbon monoxide, carbon dioxide, steam, ammonia, nitrogen monoxide, hydrogen sulfide, sulfur dioxide, methane, ethylene, benzene, methyl alcohol, ethyl alcohol, methyl ether, and ethyl ether. These gas components may exist alone or may be a mixed gas of two or more gases. Furthermore, an internal pressure of the void may be above or below an atmospheric pressure.

Further, the white polyester film requires that a void ratio taken in a cross-section of the layer (layer A), formed by using a polyester resin and a cyclic olefin copolymerized resin, is more than 25% and 75% or less. When the void ratio is 25% or less, it is difficult to achieve high brightness and high hiding property simultaneously since the number of interfacial surfaces is absolutely small, and when the void ratio is more than 75%, not only a film break occurs frequently to cause the productivity to decrease significantly, but also the number of interfacial surfaces is absolutely reduced as a whole because of the joining together of the voids and therefore it is difficult to achieve high brightness and high hiding property simultaneously. Herein, preferably, a lower limit of the void ratio is 30%. Further, preferably, an upper limit of the void ratio is 60%, and more preferably 55%. Further, minute voids can be observed by the observation of a film section (in a thickness direction) by a scanning electron microscope (SEM) or a transmission electron microscope (TEM). Further, the void ratio can be varied through an amount of cyclic olefin copolymerized resin to be mixed or a magnification of stretching of a film, described later.

Figure 1:
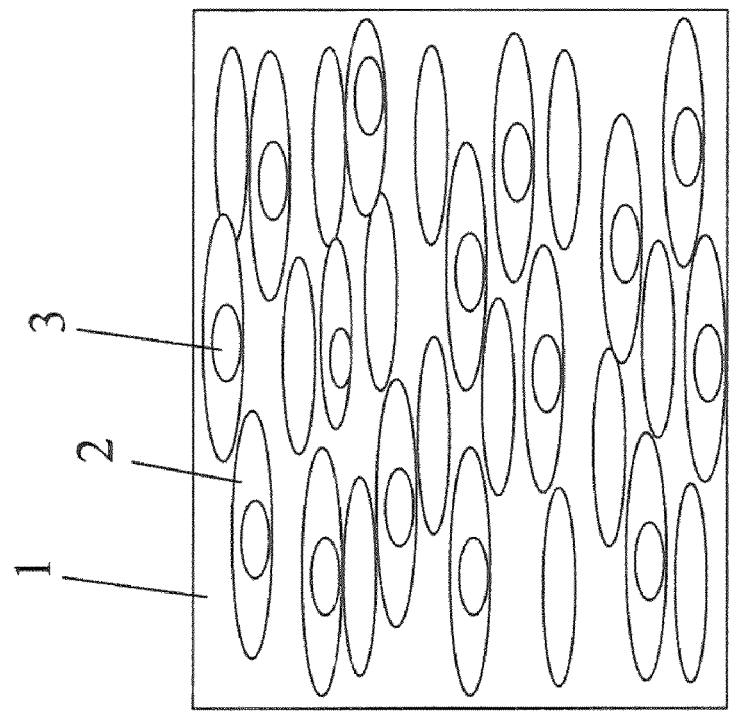
FIG. 1 is a schematic view of a cross-section of a polyester film containing voids.

The presence of the voids in the cross-section of the layer A of the white polyester film is identified by magnifying and observing the Cross-section and taking a sectional photograph using the scanning electron microscope (SEM) or the transmission electron microscope (TEM). In this case, the cyclic olefin copolymerized resin, which becomes a nucleus of void formation, may be dropped out in cutting the film, and as shown in FIG. 1, the void having a nucleus material and the void not having a nucleus material exist together, but the void ratio is determined by a measuring method described later.

On the other hand, it is necessary for achieving high brightness and high hiding property simultaneously that components constituting the white polyester film other than the void are a polyester resin and a cyclic olefin copolymerized resin. The reason why a combination of the polyester resin and the cyclic olefin copolymerized resin is necessary is that particularly in the case of applying the film to a use for a reflector of liquid crystal display, the polyester resin is suitable as a low-cost resin having heat resistance because it is often required that deformations of film due to heat do not appear during using the film and the cyclic olefin copolymerized resin becomes necessary because a resin, which is not soluble in polyester, is necessary as a resin to become a nucleus of void formation for producing voids within a film and the cyclic olefin copolymerized resin is necessary from the viewpoint of chemistry with the polyester resin to achieve an average particle size on number of the resin not soluble in polyester described later.

With respect to a polyester resin to be used for the white polyester film, examples of constituents include the following components. Typical examples of dicarboxylic acid components include terephthalic acid, isophthalic acid, 5-sodium sulfoisophthalic acid, phthalic acid, diphenic acid and ester derivatives thereof as aromatic dicarboxylic acids; adipic acid, sebacic acid, dodecadionic acid, eicosanoic acid, dimeric acid and ester derivatives thereof as aliphatic dicarboxylic acids; 1,4-cyclohexanedicarboxylic acid and ester derivatives thereof as alicyclic dicarboxylic acids; and trimellitic acid, pyromellitic acid and ester derivatives thereof as polyfunctional acids. Typical examples of diol components include polyethers such as ethylene glycol, propanediol, butanediol, neopentyl glycol, pentanediol, hexanediol, octanediol, decancyclohexane dimethanol, diethylene glycol, triethylene glycol, polyethylene glycol, tetramethylene glycol, polyethylene glycol, and polytetramethylene glycol. Considering mechanical strength, heat resistance and production cost of a polyester film to be produced, it is preferable that the polyester resin include polyethylene terephthalate as a basic constitution. The basic constitution in this case means that polyethylene terephthalate constitutes 50% by weight or more of a contained polyester resin.

Further, a copolymer component may be introduced into the basic constitution of polyethylene terephthalate. As a method for introducing the copolymer component, a method in which a copolymer component is added during polymerizing polyester pellets of a raw material to form pellets in which the copolymer component is polymerized in advance may be employed, or a method in which for example, a mixture of pellets polymerized singly like polybutylene terephthalate and polyethylene terephthalate pellets is supplied to an extruder and the mixture is copolymerized through a transesterification reaction during being melted may be employed. Amounts of these copolymer components is not particularly limited, but in terms of each property, an amount of each of a dicarboxylic acid component and a diol component is preferably 1 to 50 mol % relative to each component, and more preferably 1 to 20 mol %.

Further, a copolyester resin formed by introducing the copolymer component into Polyester may be mixed in the layer A. It is preferable that the copolymer component of the copolyester resin to be mixed is particularly a copolyester resin in which a principal component of diol components is alicyclic glycol among the above-mentioned copolymer components because the copolyester resin serves to stabilize a state of dispersion of a cyclic olefin copolymerized resin, and the content of the copolyester resin is 0.1% by weight or more and 25% by weight or less, preferably 0.1% by weight or more and 20% by weight or less, and more Preferably 5.0% by weight or more and 15% by weight or less in the layer A.

Examples of a catalyst to be used for a polycondensation reaction of the polyester resin preferably include antimony compounds, titanium compounds, germanium compounds and manganese compounds. These catalysts may be used alone or in combination. Among these catalysts, titanium compounds and germanium compounds are preferable in that these catalysts hardly produce metal catalyst agglomerates to absorb light, and titanium compounds are preferable from the viewpoint of cost. As titanium compounds, specifically, titanium alkoxide such as titanium tetrabutoxide and titanium tetraisopropoxide, complex oxides in which a predominant metal element comprises titanium and silicon like titanium dioxide-silicon dioxide complex oxide, and titanium complexes can be used. Further, ultra-fine titanium oxide such as titanium-silicon complex oxide (trade name: C-94) produced by Acordis BV can also be used.

To these polyester resins, various additives, for example, fluorescent brighteners, crosslinking agents, heat stabilizers, antioxidants, ultraviolet absorbers, organic lubricants, inorganic particles, fillers, light-resisting agents, antistatic agents, nucleating agents, dyes, dispersants, and coupling agents may be added within the range of not impairing the effects.

Examples of inorganic particles to be added to the polyester resin include calcium carbonate, titanium dioxide, zinc oxide, zirconium oxide, zinc sulfide, basic lead carbonate (white lead), and barium sulfate, but among these compounds, calcium carbonate, barium sulfate and titanium dioxide, which have less absorption in a visible light region of 400 to 700 nm in wavelength, are preferable from the viewpoint of a reflection property and a hiding property, and production cost.

By including an antioxidant in the polyester resin preferably in an amount 0.05 to 1.0% by weight, and more preferably in an amount 0.1 to 0.5% by weight, it becomes possible to perform more stable polymer extrusion and film formation. As the antioxidant, particularly, a hindered phenol-based antioxidant and a hindered amine-based antioxidant are preferable in point of dispersibility.

Further, organic particles can also be used in the polyester resin as particles. Examples of the organic particles include crosslinked polymer particles, calcium oxalate particles, acrylic particles and imido particles.

The cyclic olefin copolymerized resin to be used for the white polyester film is a copolymer of ethylene and at least one cyclic olefin selected from the group consisting of bicycloalkene and tricycloalkene.

Typical examples of the cyclic olefin include bicyclo[2,2,1]hept-2-ene, 6-methylbicyclo[2,2,1]hept-2-ene, 5,6-dimethylbicyclo[2,2,1]hept-2-ene, 1-methylbicyclo[2,2,1]hept-2-ene, 6-ethylbicyclo[2,2,1]hept-2-ene, 6-n-butylbicyclo[2,2,1]hept-2-ene, 6-i-butylbicyclo[2,2,1]hept-2-ene, 7-methylbicyclo[2,2,1]hept-2-ene, tricyclo[4,3,0,1$^{2.5}$]-3-decene, 2-methyl-tricyclo[4,3,0,1$^{2.5}$]-3-decene, 5-methyl-tricyclo[4,3,0,1$^{2.5}$]-3-decene, tricyclo[4,4,0,1$^{2.5}$]-3-decene and 10-methyl-tricyclo[4,4,0,1$^{2.5}$]-3-decene.

The cyclic olefin copolymerized resin is obtained by copolymerizing ethylene with cyclic olefin exemplified above, and in addition to these two essential components, other copolymerizable unsaturated monomer components can also be copolymerized as required. Examples of the copolymerizable unsaturated monomers include α-olefins having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosene, cyclopentene, cyclohexene, 3-methylcyclohexene, cyclooctene, 1,4-hexadiene, 4-methyl-1,4-hexadiene, methyl-1,4-hexadiene, 1,7-octadiene, dicyclopentadiene, 5-ethylidene-2-norbornene, 5-vinyl-2-norbornene, tetracyclododecene, 2-methyltetracyclododecene, and 2-ethyltetracyclododecene. The cyclic olefin copolymer can be produced by a publicly known liquid-phase polymerization method. For example, the cyclic olefin copolymerized resin can be produced according to a method exemplified in Japanese Unexamined Patent Publication No. 61-271308.

Preferably, a glass transition temperature of the cyclic olefin copolymerized resin is 120° C. or higher and 230° C. or lower. If the glass transition temperature of the cyclic olefin Copolymerized resin is less than 120° C., it is not preferable because when a film is stretched, the cyclic olefin copolymerized resin deforms plastically to impair the production of voids. Further, if the glass transition temperature of the cyclic olefin copolymerized resin is more than 230° C., dispersion of the cyclic olefin copolymerized resin in the case of melt-kneading the polyester resin and the cyclic olefin copolymerized resin to extrude the mixed resin into sheet with an extruder is inadequate and it becomes difficult to achieve the average particle size on number of a resin described below. The glass transition temperature of the cyclic olefin copolymerized resin is more preferably 185° C. or higher and 220° C. or lower, and furthermore preferably 160° C. or higher and 200° C. or lower.

Preferably, a MVR of the cyclic olefin copolymerized resin is 1 to 50 ml/10 min. From above the MVR of 1 ml/10 min, a more effect of minutely dispersing the cyclic olefin copolymerized resin is seen and an effect of increasing the interfacial surface per thickness may be seen. The effect of minutely dispersing the resin is further promoted as the MVR increases. There is not an upper limit of the MVR, but if the MVR exceeds 50 ml/10 min, it may be practically impossible to produce a film. A suitably applicable range of the MVR is preferably 1 to 30 ml/10 min and furthermore preferably 1 to 15 ml/10 min. If the MVR at 260° C. is less than 1 ml/10 min, a constraint that load is placed on a filter in melt-kneading the polyester resin and the cyclic olefin copolymerized resin to extrude the kneaded resin and therefore a discharge rate cannot be increased to a preferable level may arise or the productivity may be deteriorated. In addition, the MVR can be controlled by adjusting a reaction time, a reaction temperature, a quantity or species of a polymerization catalyst in polymerization of the cyclic olefin Copolymerized resin.

The MVR of a resin which is not soluble in polyester refers to a melt volume rate and a value measured under the conditions that the resin is heated to 260° C., measuring load is set at 2.16 kg and other conditions are set according to ASTM D 1238. A larger value indicates that viscosity is low.

In the layer constituting the white polyester film, which is formed by using a polyester resin and a cyclic olefin copolymerized resin, preferably, the amount of the polyester resin to be mixed is 60% by weight or more and less than 90% by weight and the amount of the cyclic olefin copolymerized resin to be mixed is more than 10% by weight and 40% by weight or less relative to the layer. If the amount of the cyclic olefin copolymerized resin is 10% by Weight or less, a production amount of a substance to become a nucleus for forming voids in a white polyester film ultimately obtained is small and therefore high brightness and a high hiding Property become inadequate. If, on the contrary, the amount of the cyclic olefin copolymerized resin is more than 40% by weight, it is not preferable because not only the film declines in strength and becomes vulnerable to breaks during stretching, but also a composition may decline in heat stability at the time of melt-extruding to produce thermal decomposition or resins may be joined to each other to make it difficult to achieve an average particle size of a resin described later and consequently high brightness and a high hiding property may become inadequate. Preferably, the amount of the cyclic olefin copolymerized resin to be mixed is 30% by weight or less, and more preferably 25% by weight. Further, the layer A may contain components other than the polyester resin and the cyclic olefin copolymerized resin. For example, the layer A may contain a dispersant described later.

In the white polyester film, it is necessary that the cyclic olefin copolymerized resin is dispersed in a matrix composed of a polyester resin as particles having an average particle size of 0.1 μm or more and 3 μm or less, preferably 0.2 μm or more and 2.4 μm or less, and furthermore preferably 0.5 μm or more and 2.0 μm or less. If the average particle size of the cyclic olefin copolymerized resin is less than 0.1 μm, a void thickness in a direction of a film thickness, even if voids are produced in a film, is smaller than a wavelength of visible light, and therefore the reflectivity of the interfacial surface to reflect the visible light is deteriorated and high brightness and a high hiding property cannot be achieved. On the other hand, if the average particle size is more than 3 μm, not only the film becomes vulnerable to breaks in stretching by the reduction in film strength, but also number of interfacial surfaces in a direction of a film thickness is deficient, and therefore high brightness and a high hiding property cannot be achieved. In addition, the average particle size on number is a mean value of diameters of perfect circles obtained in the case where a cross section of a film is sliced off and areas of substances of circular and elliptical portions obtained by observing the cross section with a SEM-XMA are determined to determine perfect circles which are equivalent to the circular and elliptical portions in terms of the area.

In the white polyester film, preferably, the cyclic olefin copolymerized resin is dispersed in a matrix composed of a polyester resin as particles having a variation coefficient of Particle Size of 1 or less, and more preferably 0.7 or less. In the case where the resins, which are not soluble in each other, are melt-extruded, it is important to control resin's holding time and state of dispersion in a heating tube through which melted resins pass in order to maintain uniform brightness and a uniform hiding property of a film in a width direction. As a result of our investigations, we found that since the resin's holding time in a central site in a cylindrical heating tube is different from that in a site close to the tube, the states of dispersion of the resin are different. Since this means that uneven dispersion in a width direction and uneven dispersion in a thickness direction of the sheet exhibit the same behavior in supplying a resin to a nozzle through a heating tube to form the resin into a sheet shape, a degree of macro uneven luminance in a width direction of the film can be estimated from microscopic a variation coefficient of Particle Size in a film cross-section. If the variation coefficient of Particle Size is limited to a specific value or smaller, it is more preferable since the same quality (quality not causing uneven luminance of a surface light source in the case of using the film as a reflection plate or a reflector of the surface light source) is maintained at all extraction sites in a width direction of the product. If the variation coefficient of Particle Size is more than 1, unevenness of a void size in the film becomes large, uneven luminance and unevenness of a hiding property may develop. This unevenness develops between extraction sites in a width direction of the product particularly when producing the film and it may become difficult to form a film having the same quality (quality not causing uneven luminance of a surface light source in the case of using the film as a reflection plate or a reflector of the surface light source) at all extraction sites in a width direction of the product.

A method for maintaining the average particle size on number of the cyclic olefin copolymerized resin within the above range and stabilizing a variation coefficient of Particle Size is not particularly limited but examples of preferable methods include a method in which a dispersant is further added in addition to the above-mentioned polyester resin and cyclic olefin copolymerized resin. By adding the dispersant, a dispersed particle size of the cyclic olefin copolymerized resin becomes small, and thereby, diameters of the voids produced by stretching can be decreased more and consequently the reflectivity and the total light transmittance of the film, and the stability of film forming may be improved. As the dispersant exhibiting the above effect, olefin-based polymers or copolymers having a polar group such as a carboxyl group, an epoxy group and the like, or having a functional group being reactive with polyester; polyalkylene glycols such as diethylene glycol, cyclohexadimethanol copolyester, methoxy polyethylene glycol, polytetramethylene glycol, polypropylene glycol and the like; others such as ethylenoxide-propylenoxide copolymer; and surfactants and thermal adhesive resins such as sodium dodecylbenzenesulfonate, sodium alkylsulfonate, glycerin monostearate, tetrabutylphosphonium p-aminobenzenesulfonate and the like can be used. Naturally, these compounds may be used alone or may be used in combination of two or more species. Among them, a copolymerized resin of polyalkylene glycol and polyester formed from an aliphatic diol component having 2 to 6 carbon atoms and telephthalic acid is preferable in point of miscibility with a polyester resin and improvement in dispersibility of a cyclic olefin copolymerized resin and a block copolymer of polyethylene glycol and polybutyleneterephthalate is particularly preferable. Such the dispersant may be used as polyester formed by previously copolymerizing the dispersant in a polymerization reaction, or may be used as-is. Further, by using these dispersants, there may be cases where load placed on a filter can be reduced when a polyester resin and a cyclic olefin copolymerized resin are melted, kneaded and extruded.

Preferably, an additive amount of the dispersant is 0.05 to 15% by weight, more preferably 0.05 to 10% by weight, and furthermore preferably 0.2 to 5% by weight relative to the layer (layer A) formed by using a polyester resin and a cyclic olefin copolymerized resin. If the additive amount of the dispersant is less than 0.05% by weight, an effect of forming minute voids may be decreased. If the additive amount of the dispersant is more than 15% by weight, an effect of addition of the cyclic olefin copolymerized resin becomes small and problems that production stability is deteriorated and cost is raised easily arise.

Preferably, another layer is layered on the outer surface of the layer A.

The reason why a polyester resin not substantially containing a cyclic olefin copolymerized resin is layered on at least one side of the layer A by a method such as a co-extrusion method is that (i) since a void-containing layer and a surface layer can be separately designed, a gloss level or a whiteness degree of the surface can be easily adjusted through the separation of functions, and (ii) it is preferable from the viewpoint of preventing film breaks during producing films by disposing a surface layer. Herein, that the cyclic olefin copolymerized resin is not substantially contained means that this resin is not added intentionally, and specifically that the content of the cyclic olefin copolymerized resin is less than 1% by weight relative to the polyester resin composing this layer. By layering such polyester resin layer (layer B), it is possible to impart surface planarity and high mechanical strength to the film. As a polyester resin to be used for the polyester resin layer (layer B), the same resins as those described previously can be used.

The layered polyester resin layer (layer B) may also contain organic or inorganic particles. In this case, the layered polyester resin layer (layer B) can also contain the voids by stretching a film in at least one direction at the time of producing the film.

It is particularly preferable since squeak noise generated by friction with another member resulting from thermal expansion is reduced by roughening the surface that the content of the particles in the layered polyester resin layer (layer B) is preferably 1 to 30% by weight, more preferably 2 to 25% by weight, and furthermore preferably 3 to 20% by weight. If the content is less than 1% by weight, an effect of forming the voids becomes low, and on the other hand, if the content is more than 30% by weight, a film break may occur in film formation. Herein, it is known that squeak noise is noise generated when in a liquid crystal backlight unit, the white polyester film and another member are expanded due to heat from a fluorescent tube or contract at the time of backlighting shutoff and therefore they rub against each other and the squeak noise is favorably reduced by forming the surface in which aforementioned white polyester film has mean surface roughness (SRa) of 100 nm or more and 450 nm or less and ten-point mean roughness (SRz) of 1 µm or more and 4 µm or less. More preferably, the mean surface roughness (SRa) is 150 nm or more and 400 nm or less and the ten-point mean roughness (SRz) of 1.2 µm or more and 3 µm or less.

Preferably, values of the above-mentioned mean surface roughness (SRa) and value of the ten-point mean roughness (SRz) are controlled in the layer A or the layer B, or the outermost surface if an applied layer (layer C) described later is formed at the outermost surface.

In the case of providing the polyester resin layer (layer B) layered on the white polyester film, examples of minute particles include calcium carbonate, titanium dioxide, zinc oxide, zirconium oxide, zinc sulfide, basic lead carbonate (white lead), and barium sulfate, but among these compounds, calcium carbonate, barium sulfate and titanium dioxide, which have less absorption in a visible light region of 400 to 700 nm in wavelength, are preferable from the viewpoint of a reflection property and a hiding property, and production cost.

When the titanium dioxide is employed, as the titanium dioxide, titanium dioxide having an anatase-type crystalline structure and a rutile-type crystalline structure are preferable. Since the rutile-type titanium dioxide has a more compact crystalline structure compared with the anatase-type titanium dioxide, the rutile-type titanium dioxide has a higher refractive index and therefore a refractive index difference between titanium dioxide and a polyester resin becomes large and a large refractive action at an interfacial surface can be obtained. Further, the rutile-type titanium dioxide has a large ultraviolet absorptivity and can enhance the heat resistance of a film, and therefore it is more preferable to use the rutile-type titanium dioxide.

Preferably, a particle size of the titanium dioxide is 0.1 to 0.5 μm. A wavelength at which the ability of titanium dioxide to reflect light is exhibited maximally is two times larger than a particle diameter of the titanium dioxide, and hence it is particularly preferable that a particle size of the titanium dioxide is 0.2 to 0.4 μm. If the particle size of titanium dioxide is less than 0.1 μm, titanium dioxide particles tends to agglomerate, resulting in difficult dispersion of the titanium dioxide particles, and if the particle size is more than 0.5 μm, reflection efficiency in a visible light region tends to decline.

In addition, an average particle size of titanium dioxide particles referred to herein is a value obtained by laying a layered film in ashes, observing the ash at a magnification of 20000 times with a scanning electron microscope (SEM), and determining an average particle size on number of 50 particle observed.

Further, if a polyester resin layer (layer B) laminated on the white polyester film is provided, the polyester resin layer may contain a light stabilizer. By containing the light stabilizer, changes in color tone of a film due to ultraviolet light can be prevented. The light stabilizer preferably used is not particularly limited as long as it is within the range of not impairing other properties, but it is desirable to select the light stabilizer which has excellent heat resistance, has good chemistry with a polyester resin and can be uniformly dispersed in the polyester resin, and has less coloring and does not have harmful effects on the reflection properties of a resin and a film because a polyester film for a reflector of liquid crystal display may be subjected to a heating step in postprocessing steps such as application, drying and vapor deposition after film-forming, and this polyester film undergoes heat evolution from a fluorescent tube attached to a backlight unit directly after its installation to the liquid crystal display or has to stand a long-term storage in a state of roll.

Such the light stabilizer is not particularly limited as long as it satisfies the above-mentioned conditions, and examples of the light stabilizer include salicylate-based, benzophenone-based, benzotriazole-based, cyanoacrylate-based and triazine-based ultraviolet absorbers, and hindered amine-based ultraviolet stabilizers.

Specific examples are as follows.
(Ultraviolet Absorber)
Salicylate-based: p-t-butylphenylsalicylate and p-octylphenylsalicylate, benzophenone-based: 2,4-dihydroxybenzophenone, 2-hydroxy-4-methoxybenzophenone, 2-hydroxy-4-methoxy-5-sulfobenzophenone, 2,2'-4,4'-tetrahydroxybenzophenone, 2,2'-dihydroxy-4-methoxybenzophenone, 2,2'-dihydroxy-4,4'-dimethoxybenzophenone and bis(2-methoxy-4-hydroxy-5-benzoylphenyl)methane benzotriazole-based: 2-(2'-hydroxy-5'-methylphenyl)benzotriazole, 2-(2'-hydroxy-5'-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2% hydroxy-3',5'-di-t-methylphenyl)-5-chlorobenzotriazole, 2-(2'-hydroxy-3',5'-di-t-butylphenyl-5-chlorobenzotriazole, 2-(2'-hydroxy-5'-t-octylphenyl)benzotriazole, 2-(2'-hydroxy-3',5'-di-t-amilphenyl)benzotriazole, 2,2' methylenebis[4-(1,1,3,3-tetramethylbutyl)-6-(2H-benzotriazole-2-phenol], 2(2'-hydroxy-5'-methacryloxyphenyl-2H-benzotriazole and 2-[2'-hydroxy-3'-(3",4",5",6"-tetrahydrophthalimidemethyl)-5'methylphenyl]benzotriazole, cyanoacrylate-based: ethyl-2-cyano-3,3'-diphenyl acrylate, triazine-based: 2-(2,4-dihydroxyphenyl)-4,6-bis-(2,4-dimethylphenyl)-1,3,5-triazine and 2,4-bis[2-hydroxy-4-butoxyphenyl]-6-(2,4-dibutoxyphenyl)-1,3,5-triazine, others: 2-ethoxy-2'-ethyloxacacidbisanilide and 2-(4,6-diphenyl-1,3,5-triazine-2-yl)-5-[(hexyl)oxy]-phenol, and 2-(4,6-bis(2,4-dimethylphenyl)-1,3,5-triazine-2-yl)-5-hydroxyphenyl-triazine-based: 2-(2,4-dihydroxyphenyl-4,6-bis-(2,4-dimethylphenyl)-1,3,5-triazine and 2,4-bis[2-hydroxy-4-butoxyphenyl]-6-(2,4-dibutoxyphenyl)-1,3,5-triazine.
(Ultraviolet Stabilizer)
Hindered amine-based: bis(2,2,6,6-tetramethyl-4-piperidyl)sebacate, polycondensation product of dimethyl succinate-1-(2-hydroxyethyl)-4-hydroxy-2,2,6,6-tetramethylpiperidine, and others: nickel bis(octylphenyl)sulfide, [2-thiobis(4-t-octylphenolato)]-n-butylamine nickel, nickel complex-3,5-di-t-butyl-4-hydroxybenzyl phosphoric monoethylate, nickel-dibutyldithiocarbamate, 2,4-di-t-butylphenyl-3',5'-di-t-butyl-4'-hydroxybenzoate and 2,4-di-t-butylphenyl-3',5'-di-t-butyl-4'-hydroxybenzoate.

Among these light stabilizers, 2,2'-4,4'-tetrahydroxybenzophenone, bis(2-methoxy-4-hydroxy-5-benzoylphenyl)methane, 2,2'-methylenebis[4-(1,1,3,3-tetramethylbutyl)-6-(2H-benzotriazole-2-yl)phenol] and 2-(4,6-diphenyl-1,3,5-triazine-2-yl)-5-[(hexyl)oxy]-phenol, which are highly miscible with polyester, are preferably applied.

The light stabilizer may be used alone or in combination of two or more species. Particularly preferably, triazine derivatives are superior in performance.

The content of the light stabilizer in the white polyester film is preferably 0.05 to 10% by weight, more preferably 0.1 to 5% by weight, and furthermore preferably 0.15 to 3% by weight relative to a layer (layer B) containing the light stabilizer. If the content of the light stabilizer is less than 0.05% by weight, the light-resistance is inadequate and changes in color tone during long-term storage become large, and if the content is more than 10% by weight, color tone of a film may change due to coloring by a light-resisting agent. As for a preferable aspect, an effect of light-resistance is improved by the combined use of the light stabilizer and titanium dioxide described above.

Considering a use for the white polyester film, it is not preferable that dust in the air adheres to the film particularly during processing and assembling steps. Therefore, preferably, a layer (C) containing an antistatic agent is provided on at least one side of the white polyester film.

Preferably, the applied layer (layer C) is a coat layer formed by applying and drying an aqueous coating solution, and stretching the resulting film in at least one direction from the viewpoint of the prevention of environmental pollution and explosion proof in the production of the film, and preferably, the applied layer is preferably formed in the production step of biaxially orienting a base film comprising a layer (A) formed by using a polyester resin and a cyclic olefin copolymerized resin, and a polyester resin layer (B). Timing of stretching is not particularly limited, but a method of biaxially stretching a film after applying the aqueous coating solution, or a method of applying the aqueous coating solution and stretching the applied film in a transverse direction after stretching a film in a machine direction (longitudinal direction of the film) is preferably employed. As an application method of the water-based coating solution, various application methods, for example, a reverse coating method, a gravure coating method, a rod coating method, a bar coating method, a die coating method and a spray coating method, can be preferably employed, but the application method is not limited to these methods.

Examples of the antistatic agent added to the applied layer (layer C) include metal powder, tin oxide-antimony-based conducting agents, and surfactants having an antistatic property, but since the antistatic agent to be used is requested to satisfy the same requirements as in selecting the light stabilizer described above, it is desirable to select the agent which has heat resistance, undergoes less coloring and does not have a detrimental effect on the reflection properties of a resin and a film. For example, the antistatic agent is preferably a copolyester containing a compound including a polyethylenesulfonate group or a compound including a carboxylate group. Examples of the cation component of the sulfonate group include sulfoterephthalic acid, 5-sulfoisophthalic acid, 4-sulfoisophthalic acid, 4-sulfonaphthalene, and 2,7-dicarboxylic acid, but the cation component of the sulfonate group is not limited these. Examples of the cation component of the carboxylate group include trimellitic acid, trimellitic anhydride, pyromellitic acid, pyromellitic anhydride, 4-methylcyclohexene-1,2,3-tricarboxylic acid, trimesic acid, 1,2,3,4-butanetetracarboxylic acid, 5-(2,5-dioxotetrahydrofurfuryl)-3-clohexene-1,2-dicarboxylic acid, cyclopentanetetracarboxylic acid, 2,3,6,7-naphthalenetetracarboxylic acid, 1,2,5,6-naphthalenetetracarboxylic acid, ethylene glycol bistrimellitate, 2,2',3,3'-diphenyltetracarboxylic acid, thiophene-2,3,4,5-tetracarboxylic acid, and ethylenetetracarboxylic acid, but the cation component of the carboxylate group is not limited to these. Among these sulfonic acids and carboxylic acids, application of sulfoterephthalic acid, 5-sul-foisophthalic acid or 4-sulfoisophthalic acid, which is superior in the heat resistance and the adhesion property to the layer (A) formed by using a polyester resin and a cyclic olefin copolymerized resin or the adhesion property to the polyester resin layer (layer B), is most preferable.

Examples of the anion component of a base include ammonium ion, potassium ion, sodium ion, and lithium ion, but it is preferable to use ammonium ion or lithium ion from the viewpoint of an antistatic property and a filming performance. An additive amount of the antistatic agent is preferably 5 to 40° A by weight relative to the total weight of the applied layer (layer C) containing the antistatic agent. If the additive amount is 5% by weight or less, the antistatic property is low, and on the other hand, if the additive amount is 40% by weight or more, the applied layer (layer C) becomes unstable to cause agglomeration, cracks, white turbidity and reduction in the antistatic property of the film and heat resistance is easily deteriorated.

Further, as for a vehicle material of the layer (C) having an antistatic agent, a filming performance is outstandingly improved by selecting a component having an adhesion property of an interfacial surface to the polyester layer (A) or (B) as the vehicle material. The material of the vehicle material is not particularly limited as long as it is a component satisfying this condition, and examples of the materials include a polyester resin, an acrylic resin, a urethane resin, an epoxy resin, a silicone resin, a urea resin and a phenolic resin. Furthermore, since by selecting particularly a copolyester containing isophthalic acid and diethylene glycol among copolyesters, the adhesion property of an interfacial surface is improved, and the resulting film can have solvent resistance, and the ability of the film to be recovered in producing a film is also excellent, this copolyester is suitably used. An amount of isophthalic acid as a polymer component is preferably 65 to 95 mole %, and more preferably 70 to 95 mole %. Further, an amount of diethylene glycol as a polymer component is preferably 50 to 95 mole %, and more preferably 60 to 90 mole %. As other copolymer components, publicly known dicarboxylic acids and diols can be used, but other copolymer components are not limited these compounds. A preferable range of a glass transition temperature of the polymerized polyester is 0 to 60° C., and more preferably 10 to 45° C.

Preferably, the content of the copolyester including isophthalic acid and diethylene glycol as a copolymer component is 60 to 95% by weight relative to the total amounts of resins constituting the layer (C) having an antistatic agent. If the content is too small, solvent resistance or adhesion at an interfacial surface to the polyester layer (A) or the polyester layer (B) may be low, and if the thickness is too large, an antistatic property may be low.

A thickness of the layer (C) having an antistatic agent is preferably 0.01 to 2 μm, and more preferably 0.1 to 1 μm. If the thickness is too small, solvent resistance or an antistatic property may be deficient, and if the thickness is too large, slipperiness may be low.

A surface resistivity of the applied layer (C) containing an antistatic agent is $1\times10^{13}$ Ohms/square or less, preferably $1\times10^{7}$ ohms/square or more and $1\times10^{13}$ ohms/square or less, and furthermore preferably $1\times10^{9}$ ohms/square or more and $1\times10^{11}$ ohms/square or less. If the surface resistivity is less than $1\times10^{7}$ ohms/square, adhesion at the interfacial surface may be low, and if the surface resistivity is more than $1\times10^{13}$ ohms/square, an antistatic property may be deficient and hence an anti-fouling property may be deficient. Further, to attain the surface resistivity of $1\times10^{13}$ ohms/square or less, for example, lithium salt of a copolyester containing one or more species selected from sulfoterephthalic acid, 5-sulfoisophthalic acid and 4-sulfoisophthalic acid may be used, and thereby the surface resistivity of $1\times10^{11}$ ohms/square can be realized. Further, if changing to ammonium salt of sulfoterephthalic acid, the surface resistivity of $1\times10^{7}$ to $1\times10^{10}$ ohms/square can be achieved.

An applied layer (D) having an ultraviolet absorbing power may be provided on at least one side of the white polyester film. Particularly when the layer B does not contain a light stabilizer, the installation of the applied layer (D) is preferable because this layer can prevent the film from yellowing during long-term use. The applied layer (D) having an ultraviolet absorbing power may be a single layer or multiple layers, and when the multiple layers are used, it is desirable in point of retaining weather resistance that any one layer is a layer containing the ultraviolet absorber and preferably, two or more layers are a layer containing the ultraviolet absorber. The ultraviolet absorbing layer can be prepared by layering resins formed by including the ultraviolet absorber, for example, a benzophenone-based, a benzotriazole-based, a triazine-based, a cyanoacrylate-based, an ester salicylate-based, a benzoate or an inorganic ultraviolet-shielding agent in a resin component such as a thermoplastic resin, a thermosetting resin or an activated curable resin or by copolymerizing the above-mentioned ultraviolet absorber with the above-mentioned resin component. Among them, benzotriazole-based ultraviolet absorbers are more preferable.

A benzotriazole-based ultraviolet absorbing monomer is not particularly limited as long as it is a monomer which has benzotriazole as a basic skeleton and has an unsaturated double bond, but examples of preferable monomers include 2-(2'-hydroxy-5'-acryloyloxyethylphenyl)-2H-benzotriazole, 2-(2'-hydroxy-5'-methacryloxyethylphenyl)-2H-benzotriazole, and 2-(2'-hydroxy-3'-tert-butyl-5'-acryloyloxyethylphenyl)-5-chloro-2H-benzotriazole. Examples of acrylic monomer and/or oligomer to be copolymerized with these monomers include alkyl acrylate, alkyl methacrylate, and monomers having a crosslinkable functional group, for example, monomers having a carboxyl group, a methylol group, an acid anhydride group, a sulfonic acid group, an amide group, an amino group, a hydroxyl group, and an epoxy group.

In the applied layer having an ultraviolet absorbing power, the above-mentioned acrylic monomer and/or one or two or more oligomers may be copolymerized in an arbitrary ratio, but it is preferable in point of the hardness of a layered film that methyl methacrylate or styrene is polymerized preferably in an amount 20% by weight or more, and more preferably in an amount 30% by weight or more relative to an acrylic monomer. As for a ratio of copolymerization between benzotriazole-based monomer and acrylic monomer, it is preferable in point of durability or adhesion to a base film that a ratio of benzotriazole-based monomer is 10% by weight or more and 70% by weight or less, preferably 20% by weight or more and 65% by weight or less, and more preferably 25% by weight or more and 60% by weight or less. A molecular weight of the copolymer is not particularly limited, but it is preferable from the viewpoint of the durability of the applied layer that the molecular weight is preferably 5000 or more, and more preferably 10000 or more. As for the preparation of the copolymer, the copolymer can be obtained by a method such as radical polymerization and this method is not particularly limited. The above-mentioned copolymer is layered on the base film as an organic solvent or a water-dispersed matter, and it is particularly preferable from the viewpoint of light-resistance that its thickness is commonly 0.5 to 15 preferably 1 to 10 μm, and more preferably 1 to 5 μm.

In the layer D, organic and/or inorganic particles may be added to the applied layer for the purpose of adjusting a gloss level of the surface. As the inorganic particles, silica, alumina, titanium dioxide, zinc oxide, barium sulfate, calcium carbonate, zeolite, kaolin, and talc can be employed, and as the organic particles, silicone-based compounds, crosslinked styrene, crosslinked acryl, and crosslinked melamine can be employed. Preferably, the particle sizes of the organic particle and/or the inorganic particle are 0.05 to 15 μm, and preferably 0.1 to 10 μm. Further, the content of the organic and/or inorganic particles is preferably 5 to 50% by weight, more preferably 6 to 30% by weight, and furthermore preferably 7 to 20% by weight relative to a dried weight of the applied layer having an ultraviolet absorbing power. By specifying a particle size of the particles contained within the above-mentioned range, it is possible to prevent the dropping out of particles and adjust the gloss level of the surface, and therefore it is preferable.

The layer (D) may be applied by any method. The methods such as a gravure coating, roller coating, spin coating, reverse coating, bar coating, screen coating, blade coating, air knife coating, dipping and extrusion laminating may be employed, but particularly, an application method by kiss coating using a microgravure roll is preferable since it is superior in the appearance of coating and the uniformity of a gloss level. When the applied layer is cured after applying it, a publicly known method can be employed as a method for curing the applied layer. For example, heat setting, or methods of using active rays such as ultraviolet light, electron beams and radioactive rays, or methods of combination thereof can be applied. A heat setting method using a hot air oven and an ultraviolet curing method based on ultraviolet irradiation are preferable. Further, as a method for providing the applied layer, a method in which the applied layer is applied (in line coating) concurrently with the production of a base film may be used, or a method in which the applied layer is applied (off line coating) onto a base film in which the crystalline orientation has been completed.

Various additives may be added to the layer D. As the additives, for example, fluorescent brighteners, crosslinking agents, heat stabilizers, antistatic agents, and coupling agents can be used, but when the layer D includes the antistatic agent, the antistatic agent is preferably added to the outermost surface of the layer D.

Preferably, the apparent density of the entire film is 0.5 to 1.0 $g/cm^3$, more preferably 0.6 to 1.0 $g/cm^3$, and particularly preferably 0.7 to 1.0 $g/cm^3$. If the apparent density is less than 0.5 $g/cm^3$, it is not preferable since problems that film strength is low and this may cause film breaks, wrinkles are produced during processing in three dimensions, or a film break occurs often in a production step of a film and productivity is deteriorated arise. Further, if the apparent density is more than 1.0 $g/cm^3$, since number of voids existing in a polyester film is deficient, the reflectivity may be deteriorated.

In the white polyester film, thermal shrinkage in case of leaving a film at 80° C. for 30 minutes is preferably 0.5% or less, more preferably 0.0 to 0.3%, and furthermore preferably 0.0 to 0.1% both in a longitudinal direction and in a width direction. If the thermal shrinkage is more than 0.5%, it is not preferable because changes in the dimension of the film become large and the planarity of the film is deteriorated and therefore uneven luminance may occur. Preferably, thermal shrinkage is 0.0% or more. If the thermal shrinkage is less than 0.0%, that is, if the film has a tendency to extend in heating the film, it extends by heat of a cold cathode tube after the film is incorporated into a backlight unit and therefore deflection or surging easily occurs. A method of limiting the thermal shrinkage to less than 0.5% is not particularly limited, and examples of this method generally include a technique of reducing a magnification of stretching in producing a biaxially stretched film, a technique of raising a heat treatment temperature, and a technique of subjecting to a treatment for relaxation in a width direction and/or in a longitudinal direction concurrently with a heat treatment. To attain a predetermined thermal shrinkage both in a longitudinal direction and in a width direction, it is preferable to subject the film to a treatment for relaxation also in a longitudinal direction. A method (in line treatment) in which this treatment for relaxation is performed during the production of biaxially stretched polyester film is preferable from the viewpoint of production cost, but a method (off line treatment) in which a film formed once is placed in a oven again and subjected to the treatment for relaxation may be used.

Further, in the white polyester film, it is preferable for maintaining a hiding property that a parallel light transmittance is less than 0.8%. To limit the parallel light transmittance to less than 0.8% can be achieved by enhancing a total thickness of the film or a proper void ratio, reducing the average particle size on number of the cyclic olefin copolymerized resin in the film, or adjusting a ratio between layered layers in the case of a layered film. In addition, the parallel light transmittance is more preferably 0.5% or less.

Further, it is preferable that the light reflectivity of the white polyester film is 100% or more. To limit the light reflectivity to 100% or more can be achieved by enhancing a total thickness of the film or adjusting a proper void ratio, the average particle size on number of the cyclic olefin copolymerized resin in the film or a ratio between layered layers in the case of a layered film. In addition, the light reflectivity is more preferably 101% or more, and the most preferably 102% or more.

A thickness of the white polyester film is preferably 50 to 500 µm, and more preferably 75 to 300 µm. If the thickness is less than 50 µm, it becomes difficult to secure the planarity of the film and unevenness of brightness easily occurs when it is used as a reflector. On the other hand, if the thickness is more than 500 µm, excessive thickness exceeding a thickness, which brightness performance requires, leads to increase in cost in the case where this film is used for liquid crystal display as a light reflection film. Further, when the film is a layered film, a ratio of a thickness of a surface layer part (layer B) of the film to a thickness of an inner layer part (layer A) is preferably 1/200 to 1/3, and more preferably 1/50 to 1/4. In the case of a three-layered film of surface layer part (layer B)/inner layer part (layer A)/surface layer part (layer B), this ratio is expressed by sum of both surface layer parts/inner layer part.

Next, an example of a method for producing the white polyester film will be described, but the films are not limited to this example.

It is preferable to use a raw material formed by melt-kneading a polyester resin and a cyclic olefin copolymerized resin in advance with an extruder since by this way, each resin can be melt-extruded in more uniform proportions to realize uniform film performance, discharge fluctuations during extrusion or fluctuations in a pressure to a filter can be prevented, and further a variation coefficient of Particle Size of the cyclic olefin copolymerized resin in the film can be more reduced. Furthermore, a technique, in which when the polyester resin and the cyclic olefin copolymerized resin are melt-extruded with an extruder, the cyclic olefin copolymerized resin is previously melt-kneaded in high concentration and then this kneaded resin is diluted with the polyester resin when being supplied to the extruder to form a film in such a way that the additive amount of the cyclic olefin copolymerized resin becomes a specified value, may also be employed. Further, various additives to a composition comprising a polyester resin and a cyclic olefin copolymerized resin, for example, a block copolymerized resin of polyalkylene glycol and polyester formed from an aliphatic diol component having 2 to 6 carbon atoms and telephthalic acid, or a copolyester resin in which a diol component includes alicyclic glycol is preferably melted and kneaded in advance to disperse uniformly. Furthermore, a loss fraction, generated in producing the white polyester film once, may be recycled to be used as a recovered raw material. A raw material prepared for forming the white polyester film as described above is previously vacuum-dried, and thereafter it is supplied to an extruder heated to 240 to 300° C. and melt-extruded, filtrated with a sintered filter of 20 to 40 µm cut, and then introduced into a T-die nozzle to obtain a melted sheet by extrusion.

This melted sheet is brought into close contact with a drum, in which a surface temperature is cooled to 10 to 60° C., by static electricity and cooled and solidified to prepare a non-stretched film. The non-stretched film is led to a series of rolls heated to 70 to 120° C., stretched by 3 to 5 times in a longitudinal direction (machine direction, that is, traveling direction of a film) and cooled by a series of rolls of 20 to 50° C.

Subsequently, the film is led to a tenter while being grasped with clips at both ends thereof, and is stretched by 3 to 5 times in a direction orthogonal to a longitudinal direction (a width direction) in an atmosphere heated to 90 to 150° C.

Magnifications of stretching in a longitudinal direction and in a width direction are 3 to 5 times, respectively, but an area magnification (magnification of longitudinally stretching× magnification of transversely stretching) is preferably 9 to 15 times. If the area magnification is less than 9 times, a reflectivity, a hiding property or film strength of the resulting biaxially stretched film becomes inadequate, and on the other hand, if the area magnification is more than 15 times, the film easily causes film break in stretching.

To complete the crystalline orientation of the resulting biaxially stretched film to impart planarity and dimensional stability, subsequently, heat treatment is performed at a temperature of 150 to 240° C. for 1 to 30 seconds in the tenter, and then the biaxially stretched film is slowly cooled uniformly to room temperature, and thereafter, the biaxially stretched film is subjected to a corona discharge treatment as required to further enhance the adhesion property to another material and wound to obtain the white polyester film. A treatment for relaxation of 3 to 12% in a width direction or longitudinal direction may be applied as required during the above-mentioned step of the heat treatment.

Further, biaxial stretching may be performed successively or simultaneous biaxial stretching may be performed, but when the simultaneous biaxial stretching is performed, a film break during a production step can be prevented, or transfer defects produced by adhesion to a heating roll hardly occur. Further, after biaxial stretching, the film may be re-stretched in either of longitudinal direction or a width direction.

When an antistatic layer is provided as required, an aqueous coating solution of a composition comprising aforementioned components is applied onto at least one side of a polyester film by a bar coating method and dried, and preferably, the film is stretched to form the antistatic layer. As the polyester film to which the aqueous coating solution is applied, a non-stretched film obtained by heat-melting polyester and discharging the melted polyester in the form of a film as-is, a monoaxially stretched film obtained by stretching the non-stretched film in either a longitudinal direction or a width direction, and a biaxially stretched film which is obtained by stretching the non-stretched film in two directions of a longitudinal direction and a width direction at a low magnification and can be further stretched (biaxially stretched film before re-stretching finally in a longitudinal direction and a width direction to complete the crystalline orientation) are preferable. An aqueous coating solution for a coat is applied to a running polyester film in an amount 0.5 to 50 g per 1 m² of the polyester film, and then dried, and preferably, the film is stretched. Preferably, this drying is performed at 90 to 130° C. for 2 to 20 seconds. This drying can also serves as preheating for stretching or heating during stretching.

On the white polyester film thus obtained, an applied layer having an ultraviolet absorbing power is provided by a microgravure plate-kiss coating as required, and the applied layer is dried at 80 to 140° C. and then subjected to ultraviolet irradiation to be cured.

Measuring Method and Evaluation Method of Properties

Properties were determined according to the following evaluation method and evaluation criteria.

(1) Void Ratio of Layer (Layer A) Formed by Using Polyester Resin and Cyclic Olefin Copolymerized Resin After a film was subjected to freeze treatment, a cross section of the film was sliced off along a longitudinal direction and a width direction and this cross section was magnified by 4000 times and observed using a scanning electron microscope (SEM) model S-2100A (Manufactured by Hitachi, Ltd.) and an L-sized cross-sectional photograph was taken as shown in FIG. 1. This L-sized cross-sectional photograph was magnified to B4 size and a copy of the photograph was made. A ready-made A4-sized overhead projector film was affixed to the Copied image not to run out of the image, and areas on the overhead projector film corresponding to voids (a location being not a void, seen in the depth of a void in the image, is considered as a void) in the copy of the cross-sectional photograph were blacked out with a permanent marker as shown in FIG. 2. Next, this overhead projector film, in which corresponding voids were blacked out with a permanent marker, was peeled off from the cross-sectional image, and a copy thereof was made at the same magnification again with a plain white paper in backside. An area (A) of portions blacked out with a permanent marker and an area (B) of portions not blacked out with a permanent marker were determined, and a ratio of the area of portions 4 blacked out with a permanent marker to the total area of both portions is calculated from the following equation. Ratios of blacked out areas in cross sections along a longitudinal direction and a width direction of at least three samples are averaged and the resulting average value is taken as the void ratio. In addition, when the white polyester film has a layered structure, a layer, which has the largest thickness in the ratio between layered layers measured in a measuring method (9) described later, was measured:

$$\text{Ratio of portions 4 blacked out with a permanent marker} = 100 \times A/(A+B).$$

Figure 4:
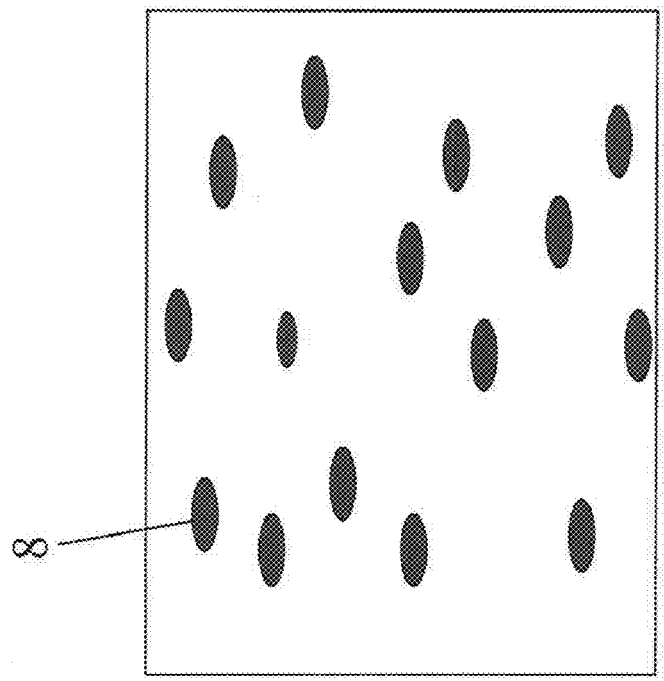
FIG. 4 is a schematic view of mapping images of a carbon element in SEM-XMA in which circular and elliptical portions of carbon images are blacked out.
Figure 3:
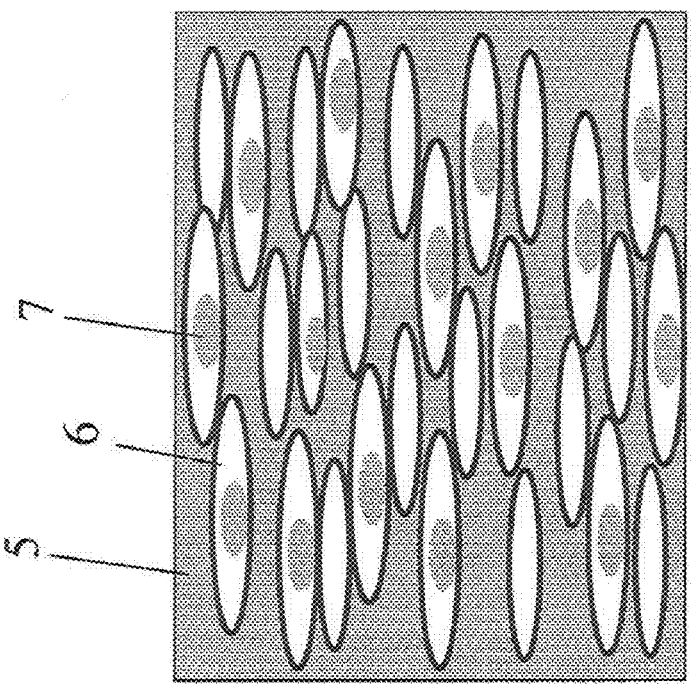
FIG. 3 is a schematic view of mapping images of a carbon element in SEM-XMA.

(2) Average Particle Size on Number and a variation coefficient of Particle Size of Cyclic Olefin Copolymerized Resin within Film After the film was subjected to freeze treatment, a cross section of the film was sliced off along a longitudinal direction and a width direction and this cross section was magnified by 4000 times and observed using SEM-XMA and an L-sized cross-sectional photograph of mapping images of a carbon element, having a scale, was taken as shown in FIG. 3. This L-sized cross-sectional photograph was magnified to B4 size and a copy of the photograph was made. A ready-made A4-sized overhead projector film was affixed to the copied image not to run out of the image, and areas on the overhead projector film corresponding to circular and elliptical portions (including circular and elliptical portions seen in the depth of a void in the image) of carbon images in the copy of the cross-sectional photograph were blacked out with a permanent Marker as shown in FIG. 4. Next, this overhead projector film, in which corresponding circular and elliptical portions were blacked out with a permanent marker, was peeled off from the cross-sectional image, and a copy thereof was made at the same magnification again with a plain white paper in backside and bugs (black points) in the copy were whited out with a correction fluid. Particle images on this copy were binarized by image processing, and perfect circles which are equivalent to the circular and elliptical portions were determined based on an area of each of circular and elliptical portions and diameters of the perfect circles are converted to actual dimension based on a scale in the cross-sectional photograph to determine diameters. This measurement was repeated to obtain one hundred or more of particle diameters and a mean value was determined from these diameters and an average of the mean value in the cross section along a longitudinal direction and the mean value in the cross section along a width direction was taken as an average particle size on number.

Further, the top 2% and the bottom 2% of the above-mentioned one hundred or more of diameter data collected as a diameter data obtained in both cross sections along the longitudinal direction and the width direction were eliminated and a standard deviation σ of the other data was calculated to determine a variation coefficient of Particle Size based on the following equation:

$$\text{Variation coefficient of Particle Size} = \sigma/\text{average particle size}.$$

In addition, when the white polyester film has a layered structure, a layer, which has the largest thickness in the ratio between layered layers measured in a measuring method (9) described later, was measured.

(3) Apparent Density of Film

A film is cut into a sheet of 100 mm×100 mm, and thicknesses at 10 points in the sheet are measured with a dial gauge (No. 2109-10 manufactured by MITUTOYO Corp.) to which a measuring element (No. 7002) of 10 mm in diameter is attached, and a mean value d (μm) of the thicknesses is calculated. Further, the film is weighed with a direct reading balance to read a weight w (g) to the fourth place of decimals. The apparent density is a value calculated from the following equation:

$$(\text{Apparent density}) = w/d \times 100 (g/cm^3).$$

(4) Parallel Light Transmittance A parallel light transmittance of a polyester film was measured with a haze meter (HZ-2 manufactured by SUGA TEST INSTRUMENTS Co., Ltd.) according to JIS K 7105 (1981).

(5) Light Reflectivity (Average Reflectivity)

(5)-a Measuring Method

A relative reflectivity in the case where an accessory device of an integrating sphere (ISR-2200 manufactured by Shimadzu Corp.) was attached to a spectrophotometer (UV-2450 manufactured by Shimadzu Corp.) and $BaSO_4$ was taken as a standard plate under the following conditions and the light reflectivity of the standard plate was taken as 100% was measured. At a Wavelength range of 420 to 670 nm, a mean value of relative reflectivity measured every 10 nm of the wavelength was taken as an average reflectivity, and the polyester film was rated according to the following criteria. In addition, Symbols ⊚, ○ and Δ represent an acceptable level.

⊚: Very good (102% or more)
○: Good (101% or more and less than 102%)
Δ: Slightly bad (100% or more and less than 101%)
x: Bad (less than 100%)

Measuring Conditions
Scanning speed: moderate speed
Slit: 5.0 nm
Reflection angle: 8°

Method for Preparing Standard Plate 34 g of a barium sulfate white standard reagent (EASTMAN White Reflectance Standard Cat No. 6091) was put in a cylindrical recessed portion of 50.8 mm in diameter and 9.5 mm in depth, and compressed with a glass plate to prepare a barium sulfate white standard plate having a compressed density of 2 $g/cm^3$.

(5)-b Measuring Method

A reflectivity in the case where an integrating sphere was attached to a spectrophotometer (U-3310) manufactured by Hitachi High-Technologies Corp. and the light reflectivity of a standard white plate (aluminum oxide) was taken as 100% was measured over a wavelength range of 400 to 700 nm. A reflectivity is read in 5 nm intervals from the resulting chart of the light reflectivity and a mean value of the reflectivities is calculated and the calculated mean value is taken as an average reflectivity.

(6) Glass Transition Temperature (6)-a Measuring Method

Using a differential scanning calorimeter (DSC-2, manufactured by Perkin Elmer Japan Co., Ltd.), 5 mg of a sample was dissolved and quenched, and then a temperature of the sample was raised again at a rate of temperature rise of 20° C./min from room temperature, and a midpoint glass transition temperature (Tmg) determined according to JIS K 7121 (1987) was adopted as a glass transition temperature.

(6)-b Measuring Method

Using a differential scanning calorimeter (DSC6200) manufactured by Seiko Instruments Inc., 10 mg of a specimen was put in a testing container and a temperature of the apparatus was raised to 300° C. at a rate of 20° C./min and cooled to room temperature, and then raised to 300° C. again at a rate of 20° C./min to read temperature data. Tg is obtained by reading a point of intersection of a tangent to a base line in a second temperature raising curve of DSC and a tangent to a temperature curve at a position in an endothermic region due to a glass transition where a temperature steeply falls.

(7) MVR (ml/10 min)

An MVR was determined as a polymer volume discharged for 10 minutes in the case of placing 2.16 kg of load at 260° C. according to ISO 1133 (2005).

(8) Thickness of Film (8)-a Measuring Method

Using a standard measuring element 900030 in a dial gauge No. 2109-10 manufactured by MITUTOYO Corp. and further using a dial gauge stand No. 7001 DGS-M, 5 sheets of film are laid one on top of another, and a thickness d (μm) of films in the case of placing 50 g of a weight on a dial gauge holding part was measured to determine a film thickness from the following equation:

$$\text{Film thickness}(\mu m) = d/5.$$

(8)-b Measuring Method

Using a micrometer M-30 (manufactured by SONY CORP.) as a constant pressure thickness gauge, a thickness of total layers of the reflection film was measured.

(9) Layer Thickness and Ratio between Layered Layers

After the film was subjected to freeze treatment, a cross section of the film was sliced off along a longitudinal direction, and this cross section was magnified by 4000 times and observed with a scanning electron microscope (SEM) model S-2100A (manufactured by Hitachi, Ltd.). A plurality of photographs of the image were taken without missing along a direction of an entire thickness so that the photographs can be joined to each other later to make one image along the entire thickness direction, and then the photographs were joined to each other to make one image along the entire thickness direction, and a length of each layer was measured from this joined photograph and converted to an actual dimension to determine a ratio between layered layers.

(10) Brightness (10)-a Measuring Method

A. Brightness in Case of Using Sample as Rear Reflector

A backlight was a straight one lamp side light type backlight (14.1 inches) to be used for a laptop computer prepared for evaluation, and the backlight, in which a film "Lumirror E60L" (film thickness 188 μm) manufactured by Toray Industries, Inc. was employed as a reflector and a rear reflector, was used.

Figure 5:
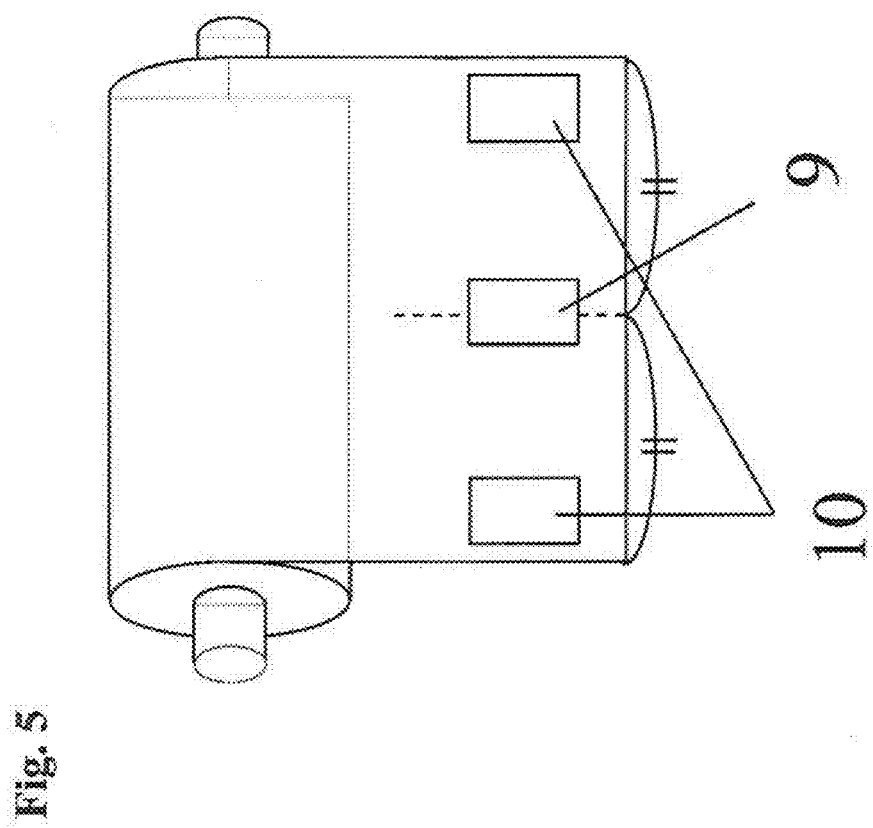
FIG. 5 is a schematic view of sampling of samples of film forming

First, sheets such as a diffusion sheet and a prism sheet on the backlight were removed, and normal brightness of 4 sections, which were formed by dividing a backlight area into two vertically and laterally, of the backlight after a lapse of 1 hour or more from lighting in an environment maintained at 25° C. was measured with a model BM-7 manufactured by TOPCON CORP. A simple average value of measurements of brightness of 4 sections was determined to determine average brightness α0. Next, a reflector fixed to the rear reflector was removed, a sample 9 of the formed film shown in FIG. 5, which is located at the center in a width direction of the formed film, was fixed to the backlight for a evaluation, and an average brightness α1 was obtained in the same manner as in α0 to evaluate according to the following equation and criteria:

$$\text{Brightness}(\%) = 100 \times \alpha 1/\alpha 0.$$

Criteria for evaluation

⊙⊙: Brightness is 105% or more
⊙: Brightness is 102% or more and less than 105%
Δ: Brightness is 100% or more and less than 102%
x: Brightness is less than 100%

The above symbols ⊙⊙ and ⊙ represent an acceptable level.

Further, an average brightness α2 of a sample 10 of the formed film, which is located at a distance of 10 cm from an end portion in a width direction of the formed film, was determined to evaluate unevenness of the brightness in a width direction according to the following equation and criteria:

$$\text{Unevenness of brightness in width direction}(\%) = 100 \times |(\alpha 1 - \alpha 2)/\alpha 1|.$$

Criteria for evaluation

⊙: Unevenness of brightness in a width direction is less than 1%
Δ: Unevenness of brightness in a width direction is 1% or more and less than 2%
x: Unevenness of brightness in a width direction is 2% or more The above symbols ⊙ and Δ represent an acceptable level.

B. Brightness in Case of Using Sample as Reflector

A backlight was a straight one lamp side light type backlight (14.1 inches) to be used for a laptop computer prepared for evaluation, and the backlight, in which a film "Lumirror E60L" (film thickness 188 μm) manufactured by Toray Industries, Inc. was employed as a reflector and a rear reflector, was used.

First, sheets such as a diffusion sheet and a prism sheet on the backlight were removed, and normal brightness of 4 sections, which were formed by dividing a backlight area into two vertically and laterally, of the backlight after a lapse of 1 hour or more from lighting in an environment maintained at 25° C. was measured with a model BM-7 manufactured by TOPCON CORP. A simple average value of measurements of brightness of 4 sections was determined to determine average brightness α3. Next, a film fixed to the reflector was removed, a sample 9 of the formed film shown in FIG. 5, which is located at the center in a width direction of the formed film, was bonded to a reflector base material from which a film was removed, and fixed to the backlight for a evaluation, and an average brightness α4 was obtained in the same manner as in α3 to evaluate according to the following equation and criteria:

Brightness(%)=100×α4/α3.

Criteria for evaluation
○: Brightness is 102% or more
Δ: Brightness is 100% or more and less than 102%
×: Brightness is less than 100%
The above symbols ○ and Δ represent an acceptable level.
Further, an average brightness α5 of a sample 10 of the formed film, which is located at a distance of 10 cm from an end portion in a width direction of the formed film, was determined to evaluate unevenness of the brightness in a width direction according to the following equation and criteria:

Unevenness of brightness in width direction(%)=100×
1|(α4−α5)|/α4.

Criteria for evaluation
○: Unevenness of brightness in a width direction is less than 1%
Δ: Unevenness of brightness in a width direction is 1% or more and less than 2%
×: Unevenness of brightness in a width direction is 2% or more
The above symbols ○ and Δ represent an acceptable level.
(10)-b Measuring Method As shown in FIG. 6, a reflection film 12 of a four lamp type backlight of a liquid crystal monitor (750B) manufactured by Samsung Japan Corp. was changed to the reflection films prepared in Examples and Comparative Examples and each reflection film was measured. Using a 100 volts power source for home use, a voltage was applied to the monitor by switching an on/off switch to measure the brightness of each film. The monitor was idled for one hour before the lightness of a cold cathode tube becomes uniform and constant. Thereafter, the brightness was measured at a measuring distance of 500 mm with a luminance calorimeter 15 (BM-7 fast manufactured by TOPCON CORP.). Number of measurements was 3 times and an average of 3 measurements was read. A relative brightness value of each film in the case where the brightness of a reflection film E6SL (total thickness of layers of the film was 250 μm) manufactured by Toray Industries, Inc. was taken as 100 was determined and evaluated.
(11) Hiding Property A total light transmittance of a polyester film was measured with a haze meter (HZ-2 Manufactured by SVGA TEST INSTRUMENTS Co., Ltd.) according to JIS K 7105 (1981), and the hiding property was rated according to the following criteria. Symbols ○○, ○ and Δ represent an acceptable level.
○○: Very good (The total light transmittance is less than 2.0%)
○: Good (The total light transmittance is 2.0% or more and less than 2.5%)
Δ: Slightly bad (The total light transmittance is 2.5% or more and less than 3.0%)
×: Bad (The total light transmittance is 3.0% or more)
(12) Stability of Film Forming The stability of film forming was evaluated based on number of the occurrences of the film break. The evaluation was performed by number of the occurrences of break per one day, and rated according to the following criteria. Symbols ○ and Δ represent an acceptable level.
○: Good (There are few occurrences of the break (less than once/day))
Δ: Slightly bad (Sometimes, the break occurs (once or twice/day))
×: Bad (The break occurs often (twice or more/day))

(13) Surface Resistivity

Using a surface resistivity measuring apparatus (MMAII-17A) manufactured by Kawaguchi Electric Works Co., Ltd., a sample was left to stand for one day in the atmosphere of temperature of 23° C. and a relative humidity of 50%. A voltage of 500 volts was applied to the sample for one minute and then the surface resistivity of the applied surface was measured. A type of a used electrode was a model (P-618) manufactured by Kawaguchi Electric Works Co., Ltd. and concentric circular electrodes in which an outer diameter of a main electrode was 90 mm and an inner diameter of a counter electrode was 45 mm.
(14) Color Tone Using a color meter SM-6 manufactured by SUGA TEST INSTRUMENTS Co., Ltd., Lab color tone was measured in the reflection mode at a viewing angle of 2 degree with C light.
(15) Ultraviolet Irradiation Test (Δb Value after Ultraviolet Irradiation)

A sample was irradiated with ultraviolet light using EYE Super UV Tester (model: SUV-W 131) manufactured by IWASAKI ELECTRIC CO., LTD, and a color tone b value was measured before and after the ultraviolet irradiation to evaluate the light-resistance of the sample. In addition, an irradiated UV light quantity was 100 mW/cm$^2$ at a wavelength of 365 nm and a UV irradiation time was 48 hours.
(16) Δb Value after Ultraviolet Irradiation After an initial b value in the above paragraph (13) was measured, the color tone b value after ultraviolet irradiation was measured by the method described in the above paragraph (14) and an amount of change in the b value was calculated from the following equation:

Δ$b$ value=$b$ value after treatment−initial $b$ value.

(17) Evaluation Method of SRa and SRz

SRa and SRz were measured according to JIS B 0601 using a surface roughness measuring instrument (model: SE-3500) manufactured by Kosaka Laboratory Ltd. Measuring conditions are as follow:
Drive speed: 0.1 mm/s
X pitch: 1.00 μm
Y pitch: 5.0 μm
Z measuring magnification: 20000
Low range cut: 0.25 mm
(18) Intrinsic Viscosity [η] of Polyester Resin As the intrinsic viscosity, a value calculated by the following equation based on the solution viscosity obtained by measuring a polyester resin in o-chlorophenol at 25° C. was used:

η$sp/C$=[η]+$K$[η]$^2$·$C$.

In the above equation, ηsp=(solution viscosity/solvent viscosity)−1, C represents a weight of polymer dissolved per 100 ml of a solvent (g/100 ml, normally 1.2), and K is a Huggins constant (assumed to be 0.343). The solution viscosity and the solvent viscosity were measured with an Ostwald viscometer. Unit is shown in [dl/g].

EXAMPLES

Our films and methods will be described by way of the following examples, but they are not limited to these examples.

Example-a

A. Polyester Resin (Polyester Resin (A1, A2))
Slurry of 100 kg of high purity terephthalic acid (manufactured by Mitsui Chemicals, inc.) and 45 kg of ethylene glycol (manufactured by NIPPON SHOKUBAI Co., Ltd.) was supplied successively to an esterification reactor over 4 hours, into which about 123 kg of bis(hydroxyethyl)terephthalate was charged in advance and which was maintained at 250° C. and at a pressure of 1.2×10⁵ Pa, and an esterification reaction was further performed over 1 hour after the completion of the supply of the slurry and 123 kg of a product of this esterification reaction was transferred to a polycondensation vessel.

Subsequently, to the polycondensation vessel to which the product of the esterification reaction was transferred, 0.01 kg of ethyl diethylphosphonoacetate was added, and further 0.04 kg of magnesium acetate tetrahydrate was added, and further an ethylene glycol solution of antimony trioxide (manufactured by Sumitomo Metal Mining Co., Ltd.) was added as a polymerization catalyst such that the amount of antimony element is 0.03 g/kg relative to the weight of the resulting polyester resin.

Thereafter, a temperature of a reaction system was raised from 250° C. to 285° C. over 60 minutes and a pressure was reduced to 40 Pa while stirring a lower polymer at a rotational speed of 30 rpm. In addition, the time being elapsed before reaching an ultimate pressure was set at 60 minutes. A reaction system was purged with a nitrogen gas at the point of reaching a predetermined stirring torque and was returned to a normal pressure to stop the polycondensation reaction, and the contents of the vessel was discharged in the form of a strand into cold water of 20° C., and the discharged resin was immediately cut to obtain pellets of a polyester resin (A1 and A2). In addition, the time being elapsed between the start of pressure reduction and reaching a Predetermined stirring torque was 3 hours in the polyester resin (A1) and 3.5 hours in the Polyester resin (A2).

The intrinsic viscosity of the obtained polyester resin (A1) was 0.65 and the intrinsic viscosity of the polyester resin (A2) was 0.78.
(Polyester Resin (A3))
Method for Synthesizing Titanium Citric Acid Chelate Compound Citric acid monohydrate (132.5 g, 0.63 moles) was dissolved in warm water (92.8 g) in a 1 liter flask equipped with a stirrer, a condenser and a thermometer to form a solution. Titanium tetraisopropoxide (72.0 g, 0.25 moles) was added from a dropping funnel to the solution being stirred. The resulting mixture was heated and refluxed for one hour to produce a cloudy solution, and from this, mixture of isopropanol and water was distilled off under vacuum. The resulting product was cooled to 20° C., and to this stirred solution, a 32% by weight aqueous solution of NaOH (94 86 g, 0.76 moles) was added from a dropping funnel. The resulting product was filtered, filtrate was mixed with ethylene glycol (125.54 g, 2 moles) and the resulting mixture was heated in a vacuum to remove isopropanol and water to obtain a slightly cloud and light yellow product (Ti content 3.85% by weight).
Polymerization Reaction Slurry of 100 kg of high purity terephthalic acid (manufactured by Mitsui Chemicals, Inc.) and 45 kg of ethylene glycol (manufactured by NIPPON SHOKUBAI Co., Ltd.) was supplied successively to an esterification reactor over 4 hours, into which about 123 kg of bis(hydroxyethyl)terephthalate was charged in advance and which was maintained at 250° C. and at a pressure of 1.2×10⁵ Pa, and an esterification reaction was further performed over 1 hour after the completion of the supply of the slurry and 123 kg of a product of this esterification reaction was transferred to a polycondensation vessel.

Subsequently, to the polycondensation vessel to which the product of the esterification reaction was transferred, 0.01 kg of ethyl diethylphosphonoacetate was added, and further 0.04 kg of magnesium acetate tetrahydrate was added, and further an ethylene glycol solution of a titanium citric acid chelate compound was added as a polymerization catalyst such that the amount of titanium element is 0.005 g/kg.

Thereafter, a temperature of a reaction system was raised from 250° C. to 285° C. over 60 minutes and a pressure was reduced to 40 Pa while stirring a lower polymer at a rotational speed of 30 rpm. In addition, the time being elapsed before reaching an ultimate pressure was set at 60 minutes. A reaction system was purged with a nitrogen gas at the point of reaching a predetermined stirring torque and was returned to a normal pressure to stop the polycondensation reaction, and the contents of the vessel was discharged in the form of a strand into cold water of 20° C., and the discharged resin was immediately cut to obtain pellets of a polyester resin. In addition, the time being elapsed between the start of pressure reduction and reaching a predetermined stirring torque was 3 hours.

The intrinsic viscosity of the obtained polyester resin was 0.65.
Polyester Resin

TABLE 1

| Polyester Resin | |
|---|---|
| Type | Intrinsic viscosity |
| A1 (Antimony catalyst) | 0.65 |
| A2 (Antimony catalyst) | 0.78 |
| A3 (Titanium catalyst) | 0.65 |

B. Cyclic Olefin Copolymerized Resin (Cyclic Olefin Copolymerized Resin (B1))
"TOPAS 6013" (glass transition temperature: 140° C., MVR: 14 ml/10 min), manufactured by Polyplastics Co., Ltd., which is a copolymer of ethylene and norbornene, was used.
(Cyclic Olefin Copolymerized Resin (B2))
"TOPAS 6015" (glass transition temperature: 160° C., MVR: 4 ml/10 min), manufactured by Polyplastics Co., Ltd., which is a copolymer of ethylene and norbornene, was used.
(Cyclic Olefin Copolymerized Resin (B3))

A toluene solution of norbornene was added to an autoclave filled with an ethylene gas and the toluene solution was further saturated with a high-pressure ethylene gas. Thereafter, a toluene solution of methylaluminoxane was added to the saturated toluene solution and the resulting mixture was stirred at 70° C. for 30 minutes. Meanwhile, a titanium-based metallocene catalyst was dissolved in a methylaluminoxane-toluene solution in a container other than the autoclave and left to stand for 15 minutes to activate the catalyst. This activated catalyst was added to the autoclave to initiate polymerization. The polymerization was performed for one hour in a high-pressure ethylene gas.

Next, a reacted solution after the completion of the polymerization was drawn out from the autoclave, and to this, acetone was added, and the resulting mixture was stirred for 10 minutes and a precipitation was separated by filtration. The separated cake-like resin was washed with alternating 10% hydrochloric acid and acetone three times and was ultimately suspended again in acetone, and solid contents were separated by filtration. Thereafter, the solid contents was dried at 80° C. for 15 hours in a reduced pressure and then heated to 280° C. to be melted, and the melted resin was discharged in the form of a strand into cold water of 20° C., and the discharged resin was immediately cut to obtain pellets of the cyclic olefin copolymerized resin (B3). The copolymer composition of the obtained cyclic olefin copolymerized resin (B3) was identified by $^1$H-NMR, and consequently the copolymerized resin was a copolymer composed of norbornene and ethylene in proportions of 80:20 and the copolymer had a glass transition temperature of 160° C. and a MVR of 2 ml/10 min.

(Cyclic Olefin Copolymerized Resins (B4 to B7))

A hydrogen gas was injected in a high-pressure ethylene gas at a certain ratio and species of a metallocene catalyst and a polymerization time were varied to obtain cyclic olefin copolymerized resins (B4 to B7). Ratios of copolymerization and properties of the copolymerized resins are shown in Table 2.

Cyclic Olefin Copolymerized Resin

TABLE 2

Cyclic Olefin Copolymerized Resin

| Type | Detail | Glass transition temperature (° C.) | MVR (ml/10 min) |
|---|---|---|---|
| B1 | "TOPAS"6013 | 140 | 14 |
| B2 | "TOPAS"6015 | 160 | 4 |
| B3 | Norbornene/Ethylene = 80/20 (mol ratio) | 160 | 2 |
| B4 | Norbornene/Ethylene = 85/15 (mol ratio) | 190 | 2 |
| B5 | Norbornene/Ethylene = 85/15 (mol ratio) | 190 | 5 |
| B6 | Norbornene/Ethylene = 85/15 (mol ratio) | 190 | 0.5 |
| B7 | Norbornene/Ethylene = 70/30 (mol ratio) | 100 | 20 |

C. Dispersant (Dispersant (C1))

As the dispersant (C1), "Hytrel (R) (registered trademark) 7277" manufactured by DU PONT-TORAY Co., Ltd., being a block copolymer of polybutyleneterephthalate (PBT) and polyalkylene glycol (PAG), was used.

(Dispersant (C2))

As the dispersant (C2), polyethylene glycol having a molecular weight of 4000 was used.

D. Copolyester Resin (Copolyester Resin (D1))

"Eastar Copolyester 6763" manufactured by Eastman Chemical Co., being formed by copolymerizing cyclohexane dimethanol as a glycol component with polyethylene terephthalate, as used as a copolyester resin (D1).

Copolyester Resin (D2))

A mixture of 88 mol % of terephthalic acid and 12 mol % of isophthalic acid was used as an acid component and ethylene glycol was used as a glycol component, and antimony trioxide was added as a polymerization catalyst such that the amount of antimony trioxide was 300 ppm on the antimony atom equivalent basis relative to the resulting polyester pellet, and the resulting mixture was subjected to a polycondensation reaction to obtain a resin having intrinsic viscosity of 0.68, and this resin was used as a copolyester resin (D2).

E. Master Pellets of Various Additives (Com 1 to Com 20)

A polyester resin vacuum-dried at 160° C. for 5 hours in advance and various additives were mixed in a blending ratio by weight shown in Table 3, and the resulting mixture was supplied to a biaxial extruder heated to 280° C. to be kneaded, and the kneaded resin was discharged in the form of a strand into cold water of 20° C., and the discharged resin was immediately cut to obtain master pellets (Com 1 to Com 20).

Master Pellets

TABLE 3

Master Pellets

| | Type | | | | | Mixing ratio (% by weight) | | | | |
|---|---|---|---|---|---|---|---|---|---|---|
| Type | Polyester resin | Cyclic olefin copolymerized resin | Dispersant | Co-polyester resin | Others | Polyester resin | Cyclic olefin copolymerized resin | Dispersant | Co-polyester resin | Others |
| Com1 | A1 | B1 | C1 | D1 | | 37 | 30 | 6 | 27 | |
| Com2 | A1 | B2 | C1 | D1 | | 37 | 30 | 6 | 27 | |
| Com3 | A1 | B3 | C1 | D1 | | 37 | 30 | 6 | 27 | |
| Com4 | A1 | B4 | C1 | D1 | | 37 | 30 | 6 | 27 | |
| Com5 | A1 | B5 | C1 | D1 | | 37 | 30 | 6 | 27 | |
| Com6 | A1 | B6 | C1 | D1 | | 37 | 30 | 6 | 27 | |
| Com7 | A1 | B4 | C1 | | | 64 | 30 | 6 | | |
| Com8 | A1 | B4 | | D1 | | 43 | 30 | | 27 | |
| Com9 | A2 | B4 | C1 | D1 | | 37 | 30 | 6 | 27 | |
| Com10 | A1 | B3 | C1 | | | 64 | 30 | 6 | | |
| Com11 | A1 | B4 | C1 | D2 | | 37 | 30 | 6 | 27 | |
| Com12 | A1 | B4 | C2 | D1 | | 37 | 30 | 6 | 27 | |
| Com13 | A3 | B4 | C1 | D1 | | 37 | 30 | 6 | 27 | |
| Com14 | A2 | B7 | | | | 70 | 30 | | | |
| Com15 | A1 | (polymethyl pentene) | C1 | | | 64 | 30 | 6 | | |
| Com16 | A1 | B4 | | | | 70 | 30 | | | |
| Com17 | A1 | | | | barium sulfate particle[1] | 50 | | | | 50 |
| Com18 | A1 | | | | calcium carbonate particle[2] | 50 | | | | 50 |

TABLE 3-continued

Master Pellets

| | Type | | | | | Mixing ratio (% by weight) | | | | |
|---|---|---|---|---|---|---|---|---|---|---|
| Type | Polyester resin | Cyclic olefin copolymerized resin | Dispersant | Co-polyester resin | Others | Polyester resin | Cyclic olefin copolymerized resin | Dispersant | Co-polyester resin | Others |
| Com19 | A1 | | | | titanium dioxide particle[3] | 50 | | | | 50 |
| Com20 | A1 | | C1 | D1 | | 34 | | 12 | 54 | |

[1] barium sulfate particle having an average particle size of 0.5 μm
[2] calcium carbonate particle having an average particle size of 1 μm
[3] anatase-type titanium dioxide particle having an average particle size of 0.25 μm produced by a sulfuric acid method Example 1

A polyester resin (A1) vacuum-dried at 160° C. for 5 hours in advance and master pellets (Com 1) were supplied to an extruder (a) in the proportions of 1:2 by weight, and mixed resins were melt-extruded at 280° C., and filtrated with a filter of 30 μm cut to remove extraneous substances, and supplied to a T-die nozzle to form a melted sheet. The melted sheet was brought into close contact with a drum, a surface temperature of which was maintained at 18° C., by a static charge method and cooled and solidified to obtain a non-stretched film. Subsequently, the on-stretched film was preheated by a series of rolls heated to 85° C. according to normal methods, stretched by 3.2 times in a longitudinal direction (machine direction) with a heating roll of 90° C., and cooled by a series of rolls of 25° C. to obtain a monoaxially stretched film.

The resulting monoaxially stretched film was led to a preheating zone of 90° C. in a tenter while being grasped with clips at both ends of the film, and subsequently, the film was continuously stretched by 3.2 times in a direction orthogonal to a longitudinal direction (a width direction) in a heating zone of 100° C. Furthermore, the film was subjected to a heat treatment at 200° C. for 10 seconds in a heat-treating zone in the tenter, and then was subjected to a treatment for relaxation of 4 percent in a width direction at 180° C. Next, the film was slowly cooled uniformly and was wound to obtain a white polyester film. In addition, by varying a drum speed in obtaining the white polyester film, two kinds of films, whose thicknesses are 75 μm and 188 μm, were obtained. The ratio between resins, the amount of various additives, and properties and their effects of the obtained film are shown in Tables 4, 6 and 7.

Examples 2 to 4, Examples 8 to 12, Examples 15 to 19, Comparative Examples 2, 5

In each case, two kinds of films, whose thicknesses are 75 μm and 188 μm, were obtained in the same manner as in Example 1 except for supplying components in a blending ratio by weight shown in Table 4. The ratio between resins, the amount of various additives, and properties and their effects of the obtained film are shown in Tables 4, 6 and 7. In addition, in Example 9, since a pressure of a filter following the extruder (a) rose, a discharge rate and a film formation speed were reduced to obtain the film.

Example 5

A polyester resin (A1) vacuum-dried at 160° C. for 5 hours in advance, a cyclic polyolefin copolymerized resin (B4) and master pellets (Com 20) were supplied to the extruder (a) in the proportions of 47:20:33 by weight, and a polyester resin (A1) vacuum-dried at 160° C. for 5 hours in advance and master pellets (Com 17) were supplied to the extruder (b) in the proportions of 3:2 by weight, and both mixed resins were melt-extruded at 280° C. in the extruders (a) and (b), respectively, and filtrated with a filter of 30 μm cut to remove extraneous substances, and introduced into a T-die multiple nozzle. In this case, in the T-die multiple nozzle, the extruder (a) sent the resin to an inner layer of the film, and the extruder (b) sent the resin evenly to both outer layers of the film, and three resin flows were joined into one to form a three-layered structure while the respective resins were co-extruded into a sheet shape to form a melted layered sheet, and the melted sheet was brought into close contact with a drum, in which a surface temperature was maintained at 18° C., by a static charge method, and cooled and solidified to obtain a non-stretched film. Subsequently, the non-stretched film was preheated by a series of rolls heated to 85° C. according to normal methods, stretched by 3.3 times in a longitudinal direction (machine direction) with a heating roll of 90° C., and cooled by a series of rolls of 25° C. to obtain a monoaxially stretched film.

The resulting monoaxially stretched film was led to a preheating zone of 90° C. in a tenter while being grasped with clips at both ends of the film, and subsequently, the film was continuously stretched by 3.2 times in a direction orthogonal to a longitudinal direction (a width direction) in a heating zone of 100° C. Furthermore, the film was subjected to a heat treatment at 200° C. for 10 seconds in a heat-treating zone in the tenter, and then was subjected to a treatment for relaxation of 4 percent in a width direction at 180° C. Next, the film was slowly cooled uniformly and was wound to obtain a white polyester film. In addition, by employing two levels of drum speeds in obtaining the white polyester film, two kinds of films, whose thicknesses are 75 μm and 188 μm, were obtained. In addition, since a pressure of a filter following the extruder (a) rose, a discharge rate and a film formation speed were reduced to obtain the film. The ratio between resins, the amount of various additives, and properties and their effects of the obtained film are shown in Tables 5, 6 and 7.

Example 6

A polyester resin (A1) vacuum-dried at 160° C. for 5 hours in advance and master Pellets (Com 4) were supplied to the extruder (a) in the proportions of 33:67 by weight, and a polyester resin (A1) vacuum-dried at 160° C. for 5 hours in advance and master pellets (Com 17) were supplied to the extruder (b) in the proportions of 3:2 by weight, and both mixed resins were melt-extruded at 280° C. in the extruders (a) and (b), respectively, and filtrated with a filter of 30 μm cut to remove extraneous substances, and introduced into a T-die multiple nozzle. In this case, in the T-die multiple nozzle, the extruder (a) sent the resin to an inner layer of the film, and the extruder (b) sent the resin evenly to both outer layers of the film, and three resin flows were joined into one to form a three-layered structure while the respective resins were co-extruded into a sheet shape to form a melted layered sheet, and the melted sheet was brought into close contact with a drum, in which a surface temperature was maintained at 18° C., by a static charge method, and cooled and solidified to obtain a non-stretched film. Subsequently, the non-stretched film was preheated by a series of rolls heated to 85° C. according to normal methods, stretched by 3.3 times in a longitudinal direction (machine direction) with a heating roll of 90° C., and cooled by a series of rolls of 25° C. to obtain a monoaxially stretched film.

The resulting monoaxially stretched film was led to a preheating zone of 90° C. in a tenter while being grasped with clips at both ends of the film, and subsequently, the film was continuously stretched by 3.2 times in a direction orthogonal to a longitudinal direction (a width direction) in a heating zone of 100° C. Furthermore, the film was subjected to a heat treatment at 200° C. for 10 seconds in a heat-treating zone in the tenter, and then was subjected to a treatment for relaxation of 4 percent in a width direction at 180° C. Next, the film was slowly cooled uniformly and was wound to obtain a white polyester film. In addition, by varying a drum speed in obtaining the white polyester film, two kinds of films, whose thicknesses are 75 μm and 188 μm, were obtained. The ratio between resins and the ratio between thicknesses, the amount of various additives, and properties and their effects of the obtained film are shown in Tables 5, 6 and 7.

Examples 7, 13, 14, 21, Comparative Example 6

In each case, two kinds of films, whose thicknesses are 75 μm and 188 μm, were obtained in the same manner as in Example 6 except for supplying components in a blending ratio by weight shown in Table 5. The ratio between resins and the ratio between thicknesses, the amount of various additives, and properties and their effects of the obtained film are shown in Tables 5, 6 and 7. In addition, the film in Example 21 had the highest brightness.

Example 20

Two kinds of films, whose thicknesses are 75 μm and 188 μm, were obtained in the same manner as in Example 6 except for supplying a polyester resin (A1) vacuum-dried at 160° C. for 5 hours in advance, master pellets (Com 4), and a substance obtained by pelletizing flakes formed by crushing the film obtained in Example 6 into a cocoon-shape with a granulator to an extruder (a) in the proportions of 16:44:40 by weight. The ratio between resins and the ratio between thicknesses, the amount of various additives, and properties and their effects of the obtained film are shown in Tables 5,6 and 7.

Comparative Example 1

A polyester resin (A2) vacuum-dried at 160° C. for 5 hours in advance and master pellets (Com 14) were supplied to an extruder (a) in the proportions of 1:2 by weight, and mixed resins were melt-extruded at 280° C., and filtrated with a filter of 30 μm cut to remove extraneous substances, and supplied to a T-die nozzle to form a melted sheet. The melted sheet was brought into close contact with a drum, a surface temperature of which was maintained at 18° C., by a static charge method and cooled and solidified to obtain a non-stretched film. Subsequently, the non-stretched film was preheated by a series of rolls heated to 85° C. according to normal methods, stretched by 3 times in a longitudinal direction (machine direction) with a heating roll of 90° C., and cooled by a series of rolls of 25° C. to obtain a monoaxially stretched film.

The resulting monoaxially stretched film was led to a preheating zone of 90° C. in a tenter while being grasped with clips at both ends thereof, and subsequently, the film was continuously stretched by 3 times in a direction orthogonal to a longitudinal direction (a width direction) in a heating zone of 100° C. Furthermore, the film was subjected to a heat treatment at 200° C. for 10 seconds in a heat-treating zone in the tenter, and then was subjected to a treatment for relaxation of 4 percent in a width direction at 180° C. Next, the film was slowly cooled uniformly and was wound to obtain a white polyester film. In addition, by employing two levels of drum speeds in obtaining the white polyester film, two kinds of films, whose thicknesses are 75 μm and 188 μm, were obtained. The ratio between resins, the amount of various additives, and properties and their effects of the obtained film are shown in Tables 4, 6 and 7.

Comparative Example 3

Two kinds of films, whose thicknesses are 75 μM and 188 μm, were obtained in the same manner as in Example 1 except for supplying a cyclic polyolefin copolymerized resin (B4) vacuum-dried at 160° C. for 5 hours in advance and master pellets (Com 20) to an extruder (a) in the proportions of 3:2 by weight. The ratio between resins, the amount of various additives, and properties and their effects of the obtained film are shown in Tables 4, 6 and 7. In addition, since a pressure of a filter following the extruder (a) rose, a discharge rate and a film formation speed were reduced to obtain the film.

Comparative Example 4

Two kinds of films, whose thicknesses are 75 μm and 188 μm, were obtained in the same manner as in Example 1 except for using a master pellet (Com 15), which had been prepared by using polymethyl pentene (TPX DX820, manufactured by Mitsui Chemicals, Inc.) in place of the cyclic polyolefin copolymerized resin (B4) used in the master pellets (Com 7), in place of the master pellets (Com 1). The ratio between resins, the amount of various additives, and properties and their effects of the obtained film are shown in Tables 4, 6 and 7.

Example-b

Preparation of Raw Material for Layer (Layer A) Formed by Using Polyester Resin and Cyclic Olefin Copolymerized Resin A master chip formed by adding chips of polyethylene terephthalate (FK-PET manufactured by TORAY Industries, Inc.), a cyclohexane dimethanol copolymer ("PET-G6763" manufactured by Eastman Chemical Co.), and a copolymer of polybutyleneterephthalate and polytetramethylene glycol ("Hytrel" manufactured by DU PONT-TORAY Co., Ltd.) according to the following compounding amounts at the time of polymerizing polyethylene terephthalate was vacuum-dried at 180° C. for 3 hours, and then an extrusion temperature was set at 270 to 290° C. and the following compounding amount of cyclic olefin copolymer (poly(5-methyl)norbornene) having a glass transition temperature (Tg) of 190° C. was mixed. The resulting mixture was supplied to an extruder A heated to 270 to 290° C. and thereby a raw material polymer for a layer (layer A) formed by using a polyester resin and a cyclic olefin copolymerized resin was prepared.

Chips of polyethylene terephthalate (FK-PET manufactured by TORAY Industries, Inc.) 51.5 parts by weight Cyclic olefin copolymer (poly(5-methyl)norbornene) having a glass transition temperature (Tg) of 190° C. 23.5 parts by weight Cyclohexane dimethanol copolymer ("PET-G6763" manufactured by Eastman Chemical Co.) 18 parts by weight Copolymer of polybutyleneterephthalate and polytetramethylene glycol ("Hytrel" manufactured by DU PONT-TORAY Co., Ltd.) 7 parts by weight Preparation of Raw Material for Polyester Resin Layer (Layer B)

On the other hand, 3 parts by weight of a triazine-based light stabilizer and 10 parts by weight of titanium dioxide particles were mixed in 86.4 parts by weight of chips of polyethylene terephthalate, and in this, 0.6 part by weight of silica particles having an average particle size of 3.2 μm was mixed and the resulting mixture was vacuum-dried at 180° C. for 3 hours and then was supplied to an extruder B heated to 280° C. and thereby a raw material polymer for a polyester resin layer (layer B) was prepared.

Preparation of Raw Material for Applied Layer (Layer C)

Finally, a coating solution for forming an applied layer (layer C) containing an antistatic agent was prepared by mixing a coating material NIKASOL RX-7013ED (acrylic acid-based polyester resin emulsion) manufactured by NIPPON CARBIDE INDUSTRIES CO., INC. and a coating material VERSA YE 910 (lithium polyester sulfonate-based antistatic agent) manufactured by Nippon NSC Ltd. in the proportions of 90:10 by solid weight, diluting the resulting mixture with water and adding a surfactant RY-2 manufactured by GOO CHEMICAL CO., LTD. in an amount of 0.1% by weight relative to a total liquid.

Example 22

Using raw materials shown in Table 9, polymers were layered through a layering apparatus in such a way that a layered structure is layer B/layer A/layer B and a ratio between thicknesses of these layers is 1:23:1 and formed into a sheet shape through a T-die. Furthermore, this film was cooled and solidified on a drum, in which a surface temperature is 25° C., to prepare anon-stretched film, and the non-stretched film was led to seven rolls heated to 85 to 98° C., stretched by 3.4 times in a longitudinal direction and cooled by a series of rolls of 25° C. Subsequently, a coating solution for forming an applied layer (layer C) containing an antistatic agent was applied onto the stretched film by a bar coating method using a metering bar to prepare a layer C. The resulting applied film was led to a tenter while being grasped with clips at both ends thereof and was stretched by 3.6 times in a direction orthogonal to a longitudinal direction in an atmosphere heated to 130° C. Thereafter, the stretched film was subjected to heat setting at 190° C. in a tenter and was slowly cooled uniformly to room temperature and wound to obtain a film having a thickness of 250 μm. The average reflectivity of the obtained film was 101%, the surface resistivity of the layer C was $1 \times 10^{11}$ ohms/square, and properties as a white polyester film (base material) for a reflector of liquid crystal display are as shown in Tables 8 and 9.

Example 23

A film having a thickness of 250 μm was obtained by following the same procedure as in Example 22 except for changing a glass transition temperature (Tg) of a cycloolefin copolymer in the raw material to be supplied to the extruder A to 220° C. (however, as the cycloolefin copolymer in the raw material to be supplied to the extruder A, a cycloolefin copolymer having a MVR value shown in Table 9 was used). The average reflectivity of the obtained film was 101%, the surface resistivity of the layer C was $1 \times 10^{11}$ ohms/square, and properties as a white polyester film (base material) for a reflector of liquid crystal display are as shown in Tables 8 and 9.

Example 24

A film having a thickness of 250 μm was obtained by following the same procedure as in Example 22 except for changing a glass transition temperature (Tg) of a cycloolefin in the raw material to be supplied to the extruder A to 185° C. and not disposing the layer C (however, as the cycloolefin copolymer in the raw material to be supplied to the extruder A, a cycloolefin copolymer having a MVR value shown in Table 9 was used). The average reflectivity of the obtained film was 101%, the surface resistivity of the layer C was $1 \times 10^{16}$ ohms/square, and Properties as a white polyester film (base material) for a reflector of liquid crystal display are as shown in Tables 8 and 9.

Example 25

A film having a thickness of 250 μm was obtained by following the same procedure as in Example 22 except for changing the amount of silica particles in the raw material to be supplied to the extruder B to 0.08 part by weight (however, as the cycloolefin copolymer in the raw material to be supplied to the extruder A, a cycloolefin copolymer having a MVR value shown in Table 9 was used). The average reflectivity of the obtained film was 101%, the surface resistivity of the layer C was $1 \times 10^{11}$ ohms/square, and properties as a white polyester film (base material) for a reflector of liquid crystal display are as shown in Tables 8 and 9.

Example 26

A film having a thickness of 250 μm was obtained by following the same procedure as in Example 22 except for changing the amount of silica particles in the raw material to be supplied to the extruder B to 0.9 part by weight (however, as the cycloolefin copolymer in the raw material to be supplied to the extruder A, a cycloolefin copolymer having a MVR value shown in Table 9 was used). The average reflectivity of the obtained film was 101%, the surface resistivity of the layer C was $1 \times 10^{11}$ ohms/square, and properties as a white polyester film (base material) for a reflector of liquid crystal display are as shown in Tables 8 and 9.

Example 27

A film having a thickness of 250 μm was obtained by following the same procedure as in Example 22 except for changing the amount of silica particles in the raw material to be supplied to the extruder B to 2.5 parts by weight (however, as the cycloolefin copolymer in the raw material to be supplied to the extruder A, a cycloolefin copolymer having a MVR value shown in Table 9 was used). The average reflectivity of the obtained film was 101%, the surface resistivity of the layer C was $1 \times 10^{11}$ ohms/square, and properties as a white polyester film (base material) for a reflector of liquid crystal display are as shown in Tables 8 and 9.

Example 28

A film having a thickness of 250 μm was obtained by following the same procedure as in Example 22 except for changing the amount of titanium dioxide particles in the raw material to be supplied to the extruder B to 0 part by weight (however, as the cycloolefin copolymer in the raw material to be supplied to the extruder A, a cycloolefin copolymer having a MVR value shown in Table 9 was used). The average reflectivity of the obtained film was 101%, the surface resistivity of the layer C was $1 \times 10^{11}$ ohms/square, and properties as a white polyester film (base material) for a reflector of liquid crystal display are as shown in Tables 8 and 9.

Example 29

A film having a thickness of 250 μm was obtained by following the same procedure as in Example 22 except for changing the amount of titanium dioxide particles in the raw material to be supplied to the extruder B to 5 parts by weight (however, as the cycloolefin copolymer in the raw material to be supplied to the extruder A, a cycloolefin copolymer having a MVR value shown in Table 9 was used). The average reflectivity of the obtained film was 102%, the surface resistivity of the layer C was $1 \times 10^{11}$ ohms/square, and properties as a white polyester film (base material) for a reflector of liquid crystal display are as shown in Tables 8 and 9.

Example 30

A film having a thickness of 250 μm was obtained by following the same procedure is in Example 22 except for changing the amount of the light stabilizer in the raw material to be supplied to the extruder B to 0.5 part by weight (however, as the cycloolefin copolymer in the raw material to be supplied to the extruder A, a cycloolefin copolymer having a MVR value shown in Table 9 was used). The average reflectivity of the obtained film was 102%, the surface (resistivity of the layer C was $1 \times 10^{11}$ ohms/square, and properties as a white polyester film (base material) for a reflector of liquid crystal display are as shown in Tables 8 and 9.

Example 31

A film having a thickness of 250 μm was obtained by following the same procedure as in Example 22 except for changing the amount of the light stabilizer in the raw material to be supplied to the extruder B to 5 parts by weight (however, as the cycloolefin copolymer in the raw material to be supplied to the extruder A, a cycloolefin copolymer having a MVR value shown in Table 9 was used). The average reflectivity of the obtained film was 102%, the surface resistivity of the layer C was $1 \times 10^{11}$ ohms/square, and properties as a white polyester film (base material) for a reflector of liquid crystal display are as shown in Tables 8 and 9.

Example 32

A film having a thickness of 250 μm was obtained by following the same procedure as in Example 22 except for not using the light stabilizer in the raw material to be supplied to the extruder B and changing the amount of titanium dioxide particles in the raw material to 12 parts by weight (however, as the cycloolefin copolymer in the raw material to be supplied to the extruder A, a cycloolefin copolymer having a MVR value shown in Table 9 was used). The average reflectivity of the obtained film was 101%, the surface resistivity of the layer C was $1 \times 10^{11}$ ohms/square, and properties as a white polyester film (base material) for a reflector of liquid crystal display are as shown in Tables 8 and 9.

TABLE 4

Raw material supplied to extruder (a)
(upper field; type, lower field; blending ratio by weight)

Raw material formulation in film
(upper field; type, lower field; blending ratio by weight)

| | | | Polyester Type | Cyclic polyolefin copolymerized resin Type | Dispersant Type | Copolyester Type | Additive Type | Note |
|---|---|---|---|---|---|---|---|---|
| Example 1 | A1 | Com1 | A1 | B1 | C1 | D1 | — | Polyester resin (intrinsic viscosity 0.65) |
| | 1 | 2 | 58 | 20 | 4 | 18 | | Cyclic olefin copolymerized resin (glass transition temperature 140° C., MVR 14 ml/10 min) |
| Example 2 | A1 | Com2 | A1 | B2 | C1 | D1 | — | Polyester resin (intrinsic viscosity 0.65) |
| | 1 | 2 | 58 | 20 | 4 | 18 | | Cyclic olefin copolymerized resin (glass transition temperature 160° C., MVR 4 ml/10 min) |
| Example 3 | A1 | Com3 | A1 | B3 | C1 | D1 | — | Polyester resin (intrinsic viscosity 0.65) |
| | 1 | 2 | 58 | 20 | 4 | 18 | | Cyclic olefin copolymerized resin (glass transition temperature 160° C., MVR 2 ml/10 min) |
| Example 4 | A1 | Com4 | A1 | B4 | C1 | D1 | — | Polyester resin (intrinsic viscosity 0.65) |
| | 1 | 2 | 58 | 20 | 4 | 18 | | Cyclic olefin copolymerized resin (glass transition temperature 190° C., MVR 2 ml/10 min) |

TABLE 4-continued

Raw material supplied to extruder (a)
(upper field; type, lower field; blending ratio by weight)

Raw material formulation in film
(upper field; type, lower field; blending ratio by weight)

| | Polyester Type | Cyclic polyolefin copolymerized resin Type | Dispersant Type | Copolyester Type | Additive Type | Note |
|---|---|---|---|---|---|---|
| Example 8 | A1 1 | Com5 2 | A1 58 | B5 20 | C1 4 | D1 18 | — | Polyester resin (intrinsic viscosity 0.65) Cyclic olefin copolymerized resin (glass transition temperature 190° C., MVR 5 ml/10 min) |
| Example 9 | A1 1 | Com6 2 | A1 58 | B6 20 | C1 4 | D1 18 | — | Polyester resin (intrinsic viscosity 0.65) Cyclic olefin copolymerized resin (glass transition temperature 190° C., MVR 0.5 ml/10 min) Pressure rise occurred in an extruder (a) (there is variations in thickness) |
| Example 10 | | Com4 | A1 37 | B4 30 | C1 6 | D1 27 | — | Polyester resin (intrinsic viscosity 0.65) Cyclic olefin copolymerized resin (glass transition temperature 190° C., MVR 2 ml/10 min) |
| Example 11 | A1 1 | Com4 2 | A1 76 | B4 20 | C1 4 | — | — | Polyester resin (intrinsic viscosity 0.65) Cyclic olefin copolymerized resin (glass transition temperature 190° C., MVR 2 ml/10 min) |
| Example 12 | A1 1 | Com4 2 | A1 62 | B4 20 | — | D1 18 | — | Polyester resin (intrinsic viscosity 0.65) Cyclic olefin copolymerized resin (glass transition temperature 190° C., MVR 2 ml/10 min) |
| Example 15 | A2 1 | Com9 2 | A2 58 | B4 20 | C1 4 | D1 18 | — | Polyester resin (intrinsic viscosity 0.78) Cyclic olefin copolymerized resin (glass transition temperature 190° C., MVR 2 ml/10 min) |
| Example 16 | A1 3 | Com5 2 | A1 74.8 | B5 12 | C1 2.4 | D1 10.8 | — | Polyester resin (intrinsic viscosity 0.65) Cyclic olefin copolymerized resin (glass transition temperature 190° C., MVR 5 ml/10 min) |
| Example 17 | A1 1 | Com10 2 | A1 76 | B3 20 | C1 4 | — | — | Polyester resin (intrinsic viscosity 0.65) Cyclic olefin copolymerized resin (glass transition temperature 160° C., MVR 2 ml/10 min) |
| Example 18 | A1 1 | Com11 2 | A1 58 | B4 20 | C1 4 | D2 18 | — | Polyester resin (intrinsic viscosity 0.65) Cyclic olefin copolymerized resin (glass transition temperature 190° C., MVR 2 ml/10 min) |
| Example 19 | A1 1 | Com12 2 | A1 58 | B40 20 | C2 4 | D1 18 | — | Polyester resin (intrinsic viscosity 0.65) Cyclic olefin copolymerized resin (glass transition temperature 190° C., MVR 2 ml/10 min) |
| Comparative Example 1 | A2 1 | Com14 2 | A2 80 | B7 20 | — | — | — | Polyester resin (intrinsic viscosity 0.78) Cyclic olefin copolymerized resin (glass transition temperature 100° C., MVR 14 ml/10 min) |
| Comparative Example 2 | A1 11 | Com4 4 | A1 83.2 | B4 8 | C1 1.6 | D1 7.2 | — | Polyester resin (intrinsic viscosity 0.65) Cyclic olefin copolymerized resin (glass transition temperature 190° C., MVR 2 ml/10 min) |
| Comparative Example 3 | | Com20 2 | B4 3 | A1 13.6 | B4 60 | C1 4.8 | D1 21.6 | — | Polyester resin (intrinsic viscosity 0.65) Cyclic olefin copolymerized resin (glass transition temperature 190° C., MVR 2 ml/10 min) Pressure rise occurred in an extruder (a) (there is variations in thickness) |
| Comparative Example 4 | A2 1 | Com15 2 | A1 76 | B8 20 | C1 4 | — | — | Polyester resin (intrinsic viscosity 0.65) Cyclic olefin copolymerized resin (glass transition temperature 190° C., MVR 2 ml/10 min) |
| Comparative Example 5 | A1 1 | Com16 2 | A1 80 | B4 20 | — | — | — | Polyester resin (intrinsic viscosity 0.65) Cyclic olefin copolymerized resin (glass transition temperature 190° C., MVR 2 ml/10 min) |

TABLE 5

| | Raw material supplied to extruder (a) (upper field; type, lower field; blending ratio by weight) | | | Raw material formulation in film (upper field; type, lower field; blending ratio by weight) | | | | |
|---|---|---|---|---|---|---|---|---|
| | | | | Polyester Type | Cyclic polyolefin Copolymerized resin Type | Dispersant Type | Copolyester resin Type | Additive Type |
| Example 5 | A1 47 | Com20 33 | B4 20 | A1 58 | B4 20 | C1 4 | D1 18 | — |
| Example 6 | A1 1 | Com4 2 | | A1 58 | B4 20 | C1 4 | D1 18 | — |
| Example 7 | A1 1 | Com5 1 | | A1 66.5 | B5 15 | C1 3 | D1 15.5 | — |
| Example 13 | A1 1 | Com4 2 | | A1 58 | B4 20 | C1 4 | D1 18 | — |
| Example 14 | A1 1 | Com4 2 | | A1 58 | B4 20 | C1 4 | D1 18 | — |
| Example 20 | A1 16 | Com4 44 | Reclaim polymer (Example 6) 40 | A1 57 | B4 20 | C1 4 | D1 18 | Barium sulfate particle1 |
| Example 21 | A3 1 | Com13 2 | | A3 58 | B4 20 | C1 4 | D1 18 | — |
| Comparative Example 6 | A1 1 | Com16 2 | | A1 80 | B4 20 | — | — | — |

| | Raw material supplied to extruder (b) (upper field; type, lower field; blending ratio by weight) | | Raw material formulation in surface layer(upper field; type, lower field; blending ratio by weight) | | Layer thickness of stretched film (surface layer/inner layer/surface (layer) | Note |
|---|---|---|---|---|---|---|
| | | | Type | Additive | | |
| Example 5 | A1 3 | Com17 2 | A1 80 | barium sulfate particle 20 | 6.5/175/6.5 | Polyester resin (intrinsic viscosity 0.65); Cyclic olefin copolymerized resin (glass transition temperature 190° C., MVR 2 ml/10 min) |
| Example 6 | A1 3 | Com17 2 | A1 80 | barium sulfate particle 20 | 6.5/175/6.5 | Polyester resin (intrinsic viscosity 0.65); Cyclic olefin copolymerized resin (glass transition temperature 190° C., MVR 2 ml/10 min) |
| Example 7 | A1 3 | Com17 2 | A1 80 | barium sulfate particle 20 | 6.5/175/6.5 | Polyester resin (intrinsic viscosity 0.65); Cyclic olefin copolymerized resin (glass transition temperature 190° C., MVR 5 ml/10 min) |
| Example 13 | A1 72 | Com18 28 | A1 86 | calcium carbonate 14 | 6.5/175/6.5 | Polyester resin (intrinsic viscosity 0.65); Cyclic olefin copolymerized resin (glass transition temperature 190° C., MVR 2 ml/10 min) |
| Example 14 | A1 72 | Com19 28 | A1 86 | titanium dioxide 14 | 6.5/175/6.5 | Polyester resin (intrinsic viscosity 0.65); Cyclic olefin copolymerized resin |

TABLE 5-continued

| | | | | | | |
|---|---|---|---|---|---|---|
| Example 20 | A1 3 | Com17 2 | A1 80 | barium sulfate particle 20 | 6.5/175/6.5 | (glass transition temperature 190° C., MVR 2 ml/10 min) Polyester resin (intrinsic viscosity 0.65); Cyclic olefin copolymerized resin (glass transition temperature 190° C., MVR 2 ml/10 min) |
| Example 21 | A1 3 | Com17 2 | A1 80 | barium sulfate particle 20 | 6.5/175/6.5 | Polyester resin of titanium catalyst (intrinsic viscosity 0.65); Cyclic olefin copolymerized resin (glass transition temperature 190° C., MVR 2 ml/10 min) |
| Comparative Example 6 | A1 3 | Com17 2 | A1 80 | barium sulfate particle 20 | 6.5/175/6.5 | Polyester resin (intrinsic viscosity 0.65); Cyclic olefin copolymerized resin (glass transition temperature 190° C., MVR 2 ml/10 min) |

TABLE 6

| | Structural characteristic | | | | Optical property | | Brightness (evaluated as rear reflector) | | Stability of film forming |
|---|---|---|---|---|---|---|---|---|---|
| | Total thickness (μm) | Average particle size (Cyclic olefin copolymerized resin) μm | variation coefficient of Particle Size | Ratio of void % | Apparent density g/cm³ | Light reflectivity | Hiding property | Center | Unevenness along width direction | |
| Example 1 | 188 | 2.5 | 0.2 | 50 | 0.68 | Δ | ○ | ○ | ○ | ○ |
| Example 2 | 188 | 2 | 0.3 | 50 | 0.68 | ○ | ○○ | ○ | ○ | ○ |
| Example 3 | 188 | 1.5 | 0.4 | 50 | 0.68 | ○ | ○○ | ○ | ○ | ○ |
| Example 4 | 188 | 1 | 0.3 | 50 | 0.68 | ○○ | ○○ | ○○ | ○ | ○ |
| Example 5 | 188 | 1 | 1.1 | 50 | 0.73 | ○○ | ○○ | ○○ | Δ | ○ |
| Example 6 | 188 | 1 | 0.3 | 50 | 0.73 | ○○ | ○○ | ○○ | ○ | ○ |
| Example 7 | 188 | 0.8 | 0.3 | 40 | 0.9 | ○○ | ○○ | ○○ | ○ | ○ |
| Example 8 | 188 | 1 | 0.4 | 50 | 0.68 | ○ | ○○ | ○ | ○ | ○ |
| Example 9 | 188 | 1 | 0.2 | 50 | 0.68 | ○○ | ○○ | ○○ | ○ | Δ |
| Example 10 | 188 | 1.5 | 1.1 | 58 | 0.6 | ○ | ○○ | ○ | Δ | Δ |
| Example 11 | 188 | 1.5 | 1.2 | 50 | 0.68 | ○ | ○○ | ○ | Δ | ○ |
| Example 12 | 188 | 2.5 | 0.4 | 50 | 0.68 | Δ | ○ | ○ | ○ | ○ |
| Example 13 | 188 | 1 | 0.3 | 50 | 0.73 | ○○ | ○○ | ○ | ○ | ○ |
| Example 14 | 188 | 1 | 0.3 | 50 | 0.73 | ○○ | ○○ | ○ | ○ | ○ |
| Example 15 | 188 | 1 | 0.2 | 50 | 0.68 | ○○ | ○○ | ○ | ○ | Δ |
| Example 16 | 188 | 0.6 | 0.4 | 32 | 0.73 | ○ | ○○ | ○ | ○ | ○ |
| Example 17 | 188 | 2.5 | 1.2 | 50 | 0.68 | Δ | ○ | ○ | Δ | ○ |
| Example 18 | 188 | 1.3 | 0.8 | 50 | 0.68 | ○ | ○○ | ○ | Δ | ○ |
| Example 19 | 188 | 2 | 0.4 | 50 | 0.68 | ○ | ○○ | ○ | ○ | ○ |
| Example 20 | 188 | 1 | 0.3 | 50 | 0.73 | ○○ | ○○ | ○ | ○ | ○ |
| Example 21 | 188 | 1 | 0.3 | 50 | 0.73 | ○○ | ○○ | ○ | ○ | ○ |
| Comparative Example 1 | 188 | 5 | 0.8 | 35 | 0.86 | X | Δ | X | Δ | Δ |
| Comparative Example 2 | 188 | 0.5 | 0.4 | 20 | 1.1 | X | Δ | X | ○ | ○ |
| Comparative Example 3 | 188 | 3.5 | 1.1 | 80 | 0.48 | X | X | X | X | X |
| Comparative Example 4 | 188 | 3.5 | 0.8 | 55 | 0.6 | X | ○ | X | ○ | Δ |
| Comparative Example 5 | 188 | 4 | 0.8 | 49 | 0.7 | X | ○ | X | Δ | X |
| Comparative Example 6 | 188 | 4 | 0.8 | 49 | 0.75 | X | ○ | X | Δ | Δ |

TABLE 7

| | | Structural characteristic | | | Optical property | | Brightness (evaluated as a reflector) | | Stability of film forming |
|---|---|---|---|---|---|---|---|---|---|
| | Total thickness | Average particle size (Cyclic olefin copolymerized resin) μm | variation coefficient of Particle Size | Ratio of void % | Apparent density g/cm³ | Light reflectivity | Parallel light transmittance % | Center | Unevenness along width direction | |
| Example 1 | 75 | 2.5 | 0.2 | 50 | 0.68 | Δ | 0.5 | Δ | ○ | ○ |
| Example 2 | 75 | 2 | 0.3 | 50 | 0.68 | Δ | 0.4 | Δ | ○ | ○ |
| Example 3 | 75 | 1.5 | 0.4 | 50 | 0.68 | ○ | 0.3 | Δ | ○ | ○ |
| Example 4 | 75 | 1 | 0.3 | 50 | 0.68 | ○○ | 0.3 | ○ | ○ | ○ |
| Example 5 | 75 | 1 | 1.1 | 50 | 0.73 | ○○ | 0.3 | ○ | Δ | ○ |
| Example 6 | 75 | 1 | 0.3 | 50 | 0.73 | ○○ | 0.3 | ○ | ○ | ○ |
| Example 7 | 75 | 0.8 | 0.3 | 40 | 0.9 | ○○ | 0.3 | ○ | ○ | ○ |
| Example 8 | 75 | 2 | 0.4 | 50 | 0.68 | Δ | 0.4 | Δ | ○ | ○ |
| Example 9 | 75 | 1 | 0.2 | 50 | 0.68 | ○○ | 0.3 | ○ | ○ | Δ |
| Example 10 | 75 | 1.5 | 1.1 | 58 | 0.6 | ○○ | 0.2 | ○ | Δ | Δ |
| Example 11 | 75 | 1.5 | 1.2 | 50 | 0.68 | ○○ | 0.2 | ○ | Δ | ○ |
| Example 12 | 75 | 2.5 | 0.4 | 50 | 0.68 | ○ | 0.3 | Δ | ○ | ○ |
| Example 13 | 75 | 1 | 0.3 | 50 | 0.73 | ○○ | 0.3 | Δ | ○ | ○ |
| Example 14 | 75 | 1 | 0.3 | 50 | 0.73 | ○○ | 0.3 | Δ | ○ | ○ |
| Example 15 | 75 | 1 | 0.2 | 50 | 0.68 | ○○ | 0.3 | ○ | ○ | Δ |
| Example 16 | 75 | 0.6 | 0.4 | 32 | 0.73 | ○ | 0.5 | Δ | ○ | ○ |
| Example 17 | 75 | 2.5 | 1.2 | 50 | 0.68 | Δ | 0.5 | Δ | Δ | ○ |
| Example 18 | 75 | 1.3 | 0.8 | 50 | 0.68 | ○○ | 0.5 | ○ | Δ | ○ |
| Example 19 | 75 | 2 | 0.4 | 50 | 0.68 | ○ | 0.5 | Δ | ○ | ○ |
| Example 20 | 75 | 1 | 0.3 | 50 | 0.73 | ○○ | 0.3 | ○ | ○ | ○ |
| Example 21 | 75 | 1 | 0.3 | 50 | 0.73 | ○○ | 0.3 | ○ | ○ | ○ |
| Comparative Example 1 | 75 | 5 | 0.8 | 35 | 0.86 | X | 0.7 | X | Δ | Δ |
| Comparative Example 2 | 75 | 0.5 | 0.4 | 20 | 1.1 | X | 0.9 | X | ○ | ○ |
| Comparative Example 3 | 75 | 3.5 | 1.1 | 80 | 0.48 | X | 0.7 | X | X | X |
| Comparative Example 4 | 75 | 3.5 | 0.8 | 55 | 0.6 | X | 0.4 | X | ○ | Δ |
| Comparative Example 5 | 75 | 4 | 0.8 | 49 | 0.7 | X | 0.5 | X | Δ | X |
| Comparative Example 6 | 75 | 4 | 0.8 | 49 | 0.75 | X | 0.65 | X | Δ | Δ |

TABLE 8

| | | Structural characteristic | | | Optical property | | Brightness (evaluated as rear reflector) | | Stability of film forming |
|---|---|---|---|---|---|---|---|---|---|---|
| | Total thickness (μm) | Average particle size (Cyclic olefin copolymerized resin) μm | variation coefficient of Particle Size | Ratio of void % | Apparent density g/cm³ | Light reflectivity | Hiding property | Center | Unevenness along width direction | |
| Example 22 | 250 | 1.3 | 0.3 | 51 | 0.62 | ○○ | ○○ | ○○ | ○ | ○ |
| Example 23 | 250 | 1 | 0.5 | 46 | 0.62 | ○○ | ○○ | ○○ | ○ | ○ |
| Example 24 | 250 | 1.5 | 0.3 | 53 | 0.62 | ○○ | ○○ | ○○ | ○ | ○ |
| Example 25 | 250 | 0.8 | 0.2 | 44 | 0.62 | ○○ | ○○ | ○○ | ○ | ○ |
| Example 26 | 250 | 1.2 | 0.3 | 49 | 0.62 | ○○ | ○○ | ○○ | ○ | ○ |
| Example 27 | 250 | 0.9 | 0.3 | 47 | 0.62 | ○○ | ○○ | ○○ | ○ | ○ |
| Example 28 | 250 | 1 | 0.3 | 51 | 0.62 | ○○ | ○○ | ○○ | ○ | ○ |
| Example 29 | 250 | 1.1 | 0.6 | 51 | 0.62 | ○○ | ○○ | ○○ | ○ | ○ |
| Example 30 | 250 | 1.1 | 0.8 | 51 | 0.6 | ○○ | ○○ | ○○ | ○ | ○ |
| Example 31 | 250 | 0.9 | 0.5 | 47 | 0.62 | ○○ | ○○ | ○○ | ○ | ○ |
| Example 32 | 250 | 1 | 0.4 | 46 | 0.62 | ○○ | ○○ | ○○ | ○ | ○ |

TABLE 9

| | | | | | | Example | | | | | |
|---|---|---|---|---|---|---|---|---|---|---|---|
| | | Layer structure | | Unit | Measuring method | 22 B/A/B | 23 B/A/B | 24 B/A/B | 25 B/A/B | 26 B/A/B | 27 B/A/B |
| Film structure | Layer A | Raw material | Cycloolefin copolymer | parts by weight | | 23.5 | 23.5 | 23.5 | 23.5 | 23.5 | 23.5 |
| | | | Tg | °C. | (6)-b | 190 | 220 | 185 | 190 | 190 | 190 |
| | | | | | (6)-a | 189 | 218 | 184 | 189 | 189 | 189 |
| | | | MVR | | (7) | 2 | 15 | 3 | 10 | 5 | 7 |
| | | | CHDM copolymer | parts by weight | | 18 | 18 | 18 | 18 | 18 | 18 |
| | | | Hytrel | parts by weight | | 7 | 7 | 7 | 7 | 7 | 7 |
| | | | polyethylene-terephthalate | parts by weight | | 51.5 | 51.5 | 51.5 | 51.5 | 51.5 | 51.5 |
| | | | Layer thickness | μm | (9) | 230 | 230 | 230 | 230 | 230 | 230 |
| | Layer B | Raw material | Light stabilizer | parts by weight | | 3 | 3 | 3 | 3 | 3 | 3 |
| | | | Titanium dioxide | parts by weight | | 10 | 10 | 10 | 10 | 10 | 10 |
| | | | Silica particle | parts by weight | | 0.6 | 0.6 | 0.6 | 0.08 | 0.9 | 2.5 |
| | | | polyethylene-terephthalate | parts by weight | | 86.4 | 86.4 | 86.4 | 86.92 | 86.1 | 84.5 |
| | | | Layer thickness of one side | μm | (9) | 10 | 10 | 10 | 10 | 10 | 10 |
| | Layer C | Antistatic coat | RX-7013ED | parts by weight | | 90 | 90 | — | 90 | 90 | 90 |
| | | | YE-910 | parts by weight | | 10 | 10 | — | 10 | 10 | 10 |
| Film properties | | Total thickness of layers (film thickness) | | μm | (8)-b | 250 | 250 | 250 | 250 | 250 | 250 |
| | | Average reflectivity | | % | (5)-b | 101 | 101 | 101 | 101 | 101 | 101 |
| | | Brightness | | (*1) | (10)-b | 103 | 105 | 102 | 106 | 104 | 105 |
| | | Mean surface roughness (SRa) | | nm | (17) | 169 | 162 | 156 | 40 | 198 | 450 |
| | | Ten-point average roughness (SRz) | | μm | (17) | 2.76 | 2.85 | 3.03 | 0.94 | 2.86 | 3.98 |
| | | Surface resistivity | | Ω/□ | (13) | 1.0E+11 | 1.0E+11 | >1.0E+16 | 1.0E+11 | 1.0E+11 | 1.0E+11 |
| | | Apparent density | | g/cm³ | (3) | 0.62 | 0.62 | 0.62 | 0.62 | 0.62 | 0.62 |
| | | Color tone Δb value after ultraviolet irradiation test | | | (14)~(16) | 4.3 | 4.3 | 4.4 | 4.3 | 4.3 | 4.3 |

| | | | | | | Examples | | | | |
|---|---|---|---|---|---|---|---|---|---|---|
| | | Layer structure | | Unit | Measuring method | 28 B/A/B | 29 B/A/B | 30 B/A/B | 31 B/A/B | 32 B/A/B |
| Film structure | Layer A | Raw material | Cycloolefin copolymer | parts by weight | | 23.5 | 23.5 | 23.5 | 23.5 | 23.5 |
| | | | Tg | °C. | (6)-b | 190 | 190 | 190 | 190 | 190 |
| | | | | | (6)-a | 189 | 189 | 189 | 189 | 189 |
| | | | MVR | | (7) | 5 | 1 | 45 | 15 | 5 |
| | | | CHDM copolymer | parts by weight | | 18 | 18 | 18 | 18 | 18 |
| | | | Hytrel | parts by weight | | 7 | 7 | 7 | 7 | 7 |
| | | | polyethylene-terephthalate | parts by weight | | 51.5 | 51.5 | 51.5 | 51.5 | 51.5 |
| | | | Layer thickness | μm | (9) | 230 | 230 | 230 | 230 | 230 |
| | Layer B | Raw material | Light stabilizer | parts by weight | | 3 | 3 | 0.5 | 5 | 0 |
| | | | Titanium dioxide | parts by weight | | 0 | 5 | 10 | 10 | 12 |
| | | | Silica particle | parts by weight | | 0.6 | 0.6 | 0.6 | 0.6 | 0.6 |
| | | | polyethylene-terephthalate | parts by weight | | 96.4 | 91.4 | 88.9 | 84.4 | 89.4 |
| | | | Layer thickness of one side | μm | (9) | 10 | 10 | 10 | 10 | 10 |
| | Layer C | Antistatic coat | RX-7013ED | parts by weight | | 90 | 90 | 90 | 90 | 90 |
| | | | YE-910 | parts by weight | | 10 | 10 | 10 | 10 | 10 |
| Film properties | | Total thickness of layers (film thickness) | | μm | (8)-b | 250 | 250 | 250 | 250 | 250 |
| | | Average reflectivity | | % | (5)-b | 101 | 101 | 102 | 101 | 101 |
| | | Brightness | | (*1) | (10)-b | 104 | 103 | 103 | 105 | 104 |
| | | Mean surface roughness (SRa) | | nm | (17) | 168 | 164 | 155 | 164 | 160 |

TABLE 9-continued

| | | | | | | | |
|---|---|---|---|---|---|---|---|
| Ten-point average roughness (SRz) | μm | (17) | 2.75 | 2.95 | 2.82 | 2.85 | 2.56 |
| Surface resistivity | Ω/□ | (13) | 1.0E+11 | 1.0E+11 | 1.0E+11 | 1.0E+11 | 1.0E+11 |
| Apparent density | g/cm³ | (3) | 0.62 | 0.62 | 0.60 | 0.62 | 0.62 |
| Color tone Δb value after ultraviolet irradiation test | | (14)~(16) | 13 | 11 | 9 | 3.9 | 4.8 |

A symbol (*1) indicates the brightness of a measured film in taking the brightness of a film 250E6SL manufactured by TORAY Industries, Inc., which is selected as a reference film, as 100, based on a brightness ratio of the measured film to the reference film.

INDUSTRIAL APPLICABILITY

We provide white polyester films. More particularly, we provide a white polyester film which has an excellent reflection property and an excellent hiding property, and has high productivity, and which can be suitably used for a backlight system for image display, a reflection sheet of a lamp reflector, a reflection sheet of lighting equipment, a reflection sheet for an illuminated signboard, a back-reflection sheet for a solar cell, and the like.

The invention claimed is:

1. A white polyester film containing voids, wherein a resin constituting the film has a layer (layer A) formed by using a polyester resin and a cyclic olefin copolymerized resin, and wherein a void ratio taken in a cross-section of the layer is more than 25% and 75% or less and the average particle size of the cyclic olefin copolymerized resin in the film is 0.1 μm more and 3 μm or less and a variation coefficient of particle size of the cyclic olefin copolymerized resin in said layer A is 1 or less, wherein a glass transition temperature of said cyclic olefin copolymerized resin is 120° C. or higher and 230° C. or lower, and wherein said layer A has a content of the polyester resin of 37% by weight or more and 76% by weight or less and a content of the cyclic olefin copolymerized resin of 12% by weight or more and 30% by weight or less, and said resin constituting the layer A contains a block copolymerized resin of polyalkylene glycol and polyester comprising an aliphatic diol component having 2 to 6 carbon atoms and phthalic acid in an amount of 0.05% by weight or more and 15% by weight or less, and said layer A contains a copolyester resin in which a diol component includes alicyclic glycol in an amount of 0.1 to 25% by weight.

2. The white polyester film according to claim 1, having an apparent density of 0.5 g/cm³ or more and 1.0 g/cm³ or less.

3. The white polyester film according to claim 1, having a parallel light transmittance less than 0.8%.

4. The white polyester film according to claim 1, having a light reflectivity of 100% or more.

5. The white polyester film according to claim 1, wherein a MVR of the cyclic olefin copolymerized resin at 260° C. is 1 to 50 ml/10 min.

6. The white polyester film according to claim 1, wherein a polyester resin layer (layer B) not substantially containing a cyclic olefin copolymerized resin is layered on at least one side of said layer A.

7. The white polyester film according to claim 6, wherein a light stabilizer is contained in said layer B in an amount of 0.05 to 10% by weight relative to the layer B.

8. The white polyester film according to claim 7, wherein said light stabilizer is a triazine derivative.

9. The white polyester film according to claim 6, wherein said layer B contains titanium dioxide particles, and the particle size of the titanium dioxide is 0.1 to 0.5 μm.

10. The white polyester film according to claim 6, wherein an applied layer (C) containing an antistatic agent is layered on the outermost surface of at least one side of said layer A or said layer B and a surface resistivity of the layer C is $1 \times 10^{13}$ ohms/square or less.

11. The white polyester film according to claim 6, wherein a surface of either one side of said white polyester film has mean roughness (SRa) of 100 nm or more and 450 nm or less and ten-point mean roughness (SRz) of 1 μm or more and 4 μm or less.

12. The white polyester film according to claim 1, wherein a surface of either one side of said white polyester film has mean roughness (SRa) of 100 nm or more and 450 nm or less and ten-point mean roughness (SRz) of 1 μm or more and 4 μm or less.

13. The white polyester film according to claim 1, wherein said polyester resin is formed with a titanium compound as a polymerization catalyst.

14. A reflection sheet formed by using the white polyester film according to claim 1 as a reflecting material.

15. A method for producing the white polyester film according to claim 1, comprising a steps of
providing a raw material formed by melt-kneading the polyester resin and the cyclic olefin copolymerized resin in advance with an extruder to form a composition,
melting and kneading the block copolymerized resin of polyalkylene glycol and polyester formed from an aliphatic diol component having 2 to 6 carbon atoms and phthalic acid, and the copolyester resin in which a diol component includes alicyclic glycol to form an additive,
adding the additive to the composition comprising the polyester resin and the cyclic olefin copolymerized resin.

* * * * *